(12) United States Patent
Szubbocsev

(10) Patent No.: US 10,690,504 B2
(45) Date of Patent: Jun. 23, 2020

(54) RE-ROUTING AUTONOMOUS VEHICLES USING DYNAMIC ROUTING AND MEMORY MANAGEMENT FOR BORDER SECURITY PURPOSES

(71) Applicant: Micron Technology, Inc., Boise, ID (US)

(72) Inventor: Zoltan Szubbocsev, Haimhausen (DE)

(73) Assignee: Micron Technology, Inc., Boise, ID (US)

( * ) Notice: Subject to any disclaimer, the term of this patent is extended or adjusted under 35 U.S.C. 154(b) by 238 days.

(21) Appl. No.: 15/926,661

(22) Filed: Mar. 20, 2018

(65) Prior Publication Data

US 2019/0293437 A1  Sep. 26, 2019

(51) Int. Cl.
| | | |
|---|---|---|
| *G01C 21/34* | (2006.01) | |
| *G06K 9/00* | (2006.01) | |
| *G06Q 50/26* | (2012.01) | |
| *G06F 16/29* | (2019.01) | |
| *G07C 9/32* | (2020.01) | |

(52) U.S. Cl.
CPC ......... *G01C 21/3415* (2013.01); *G06F 16/29* (2019.01); *G06K 9/00845* (2013.01); *G06Q 50/265* (2013.01); *G07C 9/32* (2020.01)

(58) Field of Classification Search
CPC ................................................ G01C 21/3415
See application file for complete search history.

(56) References Cited

U.S. PATENT DOCUMENTS

| | | | | |
|---|---|---|---|---|
| 10,529,221 | B2 * | 1/2020 | Jarrell | H04W 4/70 |
| 2008/0215202 | A1 * | 9/2008 | Breed | G01C 21/3611 701/25 |
| 2010/0250497 | A1 * | 9/2010 | Redlich | F41H 13/00 707/661 |
| 2016/0303969 | A1 * | 10/2016 | Akula | A61B 5/6893 |
| 2018/0158340 | A1 * | 6/2018 | de Moura | G06Q 10/083 |
| 2018/0220309 | A1 * | 8/2018 | Gomes | H04W 24/02 |
| 2019/0082149 | A1 * | 3/2019 | Correnti | H04N 7/188 |
| 2019/0187704 | A1 * | 6/2019 | Gordon | G05D 1/0088 |

* cited by examiner

*Primary Examiner* — Alex C Dunn
(74) *Attorney, Agent, or Firm* — Greenberg Traurig

(57) ABSTRACT

The invention relates to a system and method for navigating an autonomous driving vehicle (ADV) that utilizes an-onboard computer and/or one or more ADV control system nodes in an ADV network platform. The on-board computer receives physiological and ADV occupant identification sensor data concerning one or more occupants occupying an ADV, sensor data concerning the items being transported within the ADV, and information concerning the ADV itself to aid border security agencies in protecting their respective borders and territories (e.g., international borders, security zone borders, geographical borders, etc.). The relevant border agency can receive certain information over a network concerning one or more ADVs and make a determination if a heightened security screening should be requested. In response to a request, the on-board computer automatically initiates a dynamic routing algorithm that utilizes artificial intelligence to re-route the ADV to a predetermined destination, for example a border security facility.

20 Claims, 14 Drawing Sheets

RE-ROUTING AUTONOMOUS VEHICLES USING DYNAMIC ROUTING AND MEMORY MANAGEMENT FOR BORDER SECURITY PURPOSES

CROSS-REFERENCE TO RELATED APPLICATIONS

None.

STATEMENT REGARDING FEDERALLY SPONSORED RESEARCH OR DEVELOPMENT

None.

FIELD OF THE INVENTION

Various embodiments relate generally to autonomous-driving vehicles, the associated features and capabilities, and the associated systems and methods utilized to perform certain functionalities. More specifically, systems, methods and devices are configured to navigate an ADV and alter a navigation route in various ways based upon input data, sensed data and received data.

BACKGROUND OF THE INVENTION

Typical approaches to driverless cars do not take into account various circumstances that a passenger in a driverless car may face while being motored to a destination across geographical security borders. For example, current self-driving vehicles systems do not properly account for the identification of the occupants of the self-driving vehicle and/or the items that are carried across the border within the vehicle. For example, utilizing self-driving vehicles to cross security borders into geographical areas (e.g, countries, designated security areas, etc.) that require vehicle occupant clearance and security screening for items that reside within the vehicle pose unique problems for both the vehicle occupants and the security personnel in the discharge of their duties.

BRIEF SUMMARY OF THE DISCLOSURE

It is an object of one or more embodiments of the present invention to improve upon the aforementioned deficiencies.

One or more embodiments described herein include a system and/or a method that is used to route and autonomously navigate an autonomous driving vehicle (ADV) using a dynamic routing algorithm that utilizes artificial intelligence and improved memory management. The system and method utilized by one or more embodiments to route and autonomously navigate an ADV using a dynamic routing algorithm that utilizes artificial intelligence and improved memory management includes an on-board computer that is programmed to autonomously navigate a vehicle. One or more embodiments of an ADV include one or more sensor devices communicatively coupled to the on-board computer, and one or more processors that are programmed to determine a vehicle location that represents a current geographical location of the vehicle.

One or more embodiments described herein include a system and/or a method that is used to route and autonomously navigate an autonomous driving vehicle (ADV) using a dynamic routing algorithm that utilizes artificial intelligence and improved memory management. The system and method utilized by one or more embodiments to route and autonomously navigate an ADV using a dynamic routing algorithm that utilizes artificial intelligence and improved memory management includes an on-board computer that is programmed to autonomously navigate a vehicle. One or more embodiments of an ADV include one or more sensor devices communicatively coupled to the on-board computer, and one or more processors that are programmed to determine a vehicle location that represents a current geographical location of the vehicle. One or more embodiments of an ADV determine a first destination that represents a first predetermined geographical destination of the vehicle, generate a map of a geographical region that includes the vehicle location, the first destination, and navigable pathways between the vehicle location and the first destination upon which the vehicle can navigate to reach the first destination. One or more embodiments of an ADV generate a first route that includes the vehicle location, the first destination, and a first set of navigable pathways included in the first route upon which the vehicle can navigate to reach the first destination. One or more embodiments of an ADV analyze information concerning the first set of navigable pathways (e.g., navigable pathway information) included in the first route and generate a first route time that represents the total time it will take the vehicle from the vehicle location to navigate the first route to reach the first destination. One or more embodiments of an ADV set the first route as the current route, set the first destination as the current destination and navigate the vehicle along the current route, periodically determine and update the vehicle location and set each updated vehicle location as a current vehicle location that represents the current geographical location of the vehicle. One or more embodiments of an ADV, in response to the determination of a current vehicle location, update the first route time to the current route time that represents the time it will take the vehicle to reach the current destination from the current vehicle location navigating the current route, generate a first alternative route set that represents a set of one or more alternative routes that the vehicle can navigate from the current vehicle location to the current destination that are different from the current route, wherein each of the alternative routes in the first alternative route set includes at least one navigable pathway that is not included in the current route and each of the other alternative routes. One or more embodiments of an ADV, in response to the identification of a route condition set that represents one or more qualifying route conditions that will be applied to each alternative route in the first alternative route set, apply a route condition set to each alternative route included in the first alternative route set and determine a qualifying route set that includes one or more qualifying routes that meet all of the qualifying conditions. One or more embodiments of an ADV, in response to no route condition set being identified, set an alternative route set as the qualifying route set, analyze information concerning the one or more navigable pathways included in each qualifying route included in the qualifying route set and generate a qualifying route time for each qualifying route that represents a time that it will take the vehicle from its current location to navigate the qualifying route to reach the current destination. One or more embodiments of an ADV determine, from a current route time and each qualifying route time, a shortest time, and in response to the shortest time being shorter than the current route time, automatically set a qualifying route associated with the shortest time as a new current route and navigate the vehicle along the new current route to reach the current destination.

One or more embodiments of an ADV include an on-board computer comprising one or more processors programmed to autonomously navigate a vehicle along a current route to a predetermined first destination. One or more embodiments of an ADV include one or more sensor devices communicatively coupled to the on-board computer, wherein the one or more sensors devices are configured to generate sensor data that is indicative of an identification of one or more persons and one or more items within the vehicle. One or more embodiments of an ADV include one or more processors that, in response to generating security screening data, are programmed to generate security screening data utilizing at least a portion of generated sensor data. One or more embodiments of an ADV include one or more processors that, in response to a request for a heightened security screening, are programmed to receive a security entity location that represents a geographical location of a security entity. One or more embodiments of an ADV include one or more processors that are programmed to determine a current vehicle location that represents a current geographical location of the vehicle. One or more embodiments of an ADV include one or more processors that are programmed to generate mapping information for a geographical area that includes the current vehicle location, a security entity location and one or more navigable pathways between the current vehicle location and the security entity location. One or more embodiments of an ADV include one or more processors that are programmed to utilize mapping information, and generate a new route from a current vehicle location to a security entity location that includes one or more of the navigable pathways and automatically re-route and autonomously navigate a vehicle from the current vehicle location to the security entity location along the new route. One or more embodiments of an ADV include a data storage device communicatively coupled to one or more processors for retrievably storing data and an in-memory processing system that includes at least one of the one or more processors to perform in-memory processing of data received from one or more devices included in the system.

One or more embodiments of an ADV include an on-board computer comprising one or more processors programmed to, in response to receiving the security entity location, utilize mapping information and generate a second route from the current vehicle location to the security entity location and a corresponding second route time that represents a time that it will take the vehicle to reach the security entity location from the current vehicle location.

One or more embodiments of an ADV include an on-board computer comprising one or more processors programmed to utilize mapping information and generate a set of one or more alternative routes that include one or more navigable pathways from a current vehicle location to a security entity location. One or more embodiments of an ADV include an on-board computer comprising one or more processors programmed to generate a set of one or more alternative route times for each generated alternative route that represents a time that it will take from a current vehicle location to reach a security entity location, wherein each alternative route includes at least one navigable pathway that is not included within a current route or any of the other alternative routes. One or more embodiments of an ADV include an on-board computer comprising one or more processors programmed to, in response to an identification of the set of one or more alternative routes, determine a new current route by comparing the second route time to the set of alternative route times, determining a shortest time between the second route time and any of the alternative route times, and setting the route associated with the shortest time as the new current route of the vehicle.

One or more embodiments of an ADV include an on-board computer comprising one or more processors programmed to, in response to a request for a heightened security screening, wirelessly transmit security screening data to a border security entity. One or more embodiments of an ADV include an on-board computer comprising one or more processors programmed to, in response to a request for a heightened security screening, wirelessly access one or more governmental data storage structures, compare at least a portion of security screening data that includes an identification of one or more occupants within a vehicle to the contents of the data storage structure. One or more embodiments of an ADV include an on-board computer comprising one or more processors programmed to utilize data stored within the one or more governmental data storage structures to confirm an identification of one or more occupants within a vehicle. One or more embodiments of an ADV include an on-board computer comprising one or more processors programmed to compare confirmed and unconfirmed security screening data to a list of factors. One or more embodiments of an ADV include an on-board computer comprising one or more processors programmed to generate a request for a heightened security screening in response to any confirmed and/or unconfirmed security screening data satisfying a factor.

One or more embodiments of an ADV include an on-board computer comprising one or more processors programmed to compare confirmed and/or unconfirmed security screening data to a list of factors wherein each factor has a numerical risk value associated therewith that can be combined to determine a level of risk, determine if the level of risk meets a risk value threshold, and generate a request for a heightened security screening in response to the level of risk meeting the risk value threshold.

One or more embodiments of an ADV include one or more sensors that comprise one or more cameras that are configured to generate image data of one or more persons within a vehicle and one or more items placed within a vehicle. One or more embodiments of an ADV include one or more sensors that comprise one or more transducers that are configured to generate data indicative of a weight of one or more items placed within a vehicle. One or more embodiments of an ADV include an on-board computer comprising one or more processors programmed to process data generated by a camera and/or a transducer to assist in an identification of one or more persons and/or one or more items within the vehicle.

One or more embodiments of an ADV include an on-board computer comprising one or more processors programmed to initiate a monitoring mode wherein at least one of one or more processors is ready to receive physiological state data concerning a person's one or more vital signs from one or more sensor devices. One or more embodiments of an ADV include an on-board computer comprising one or more processors programmed to calibrate the at least one of the one or more sensor devices with respect to one or more of the person's vital signs to obtain a normal range for the one or more vital signs.

One or more embodiments of an ADV include an on-board computer comprising one or more processors programmed to process received physiological state data to determine in real time if one or more events are detected. One or more embodiments of an ADV include an on-board computer comprising one or more processors programmed to transmit an event to a border security entity. One or more embodiments of an ADV include an on-board computer comprising one or more processors programmed to analyze the physiological state data to determine measurements of the one or more vital signs, and compare the current measurement of the one or more vital signs to a predetermined normal range of the one or more vital signs for the person.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1:
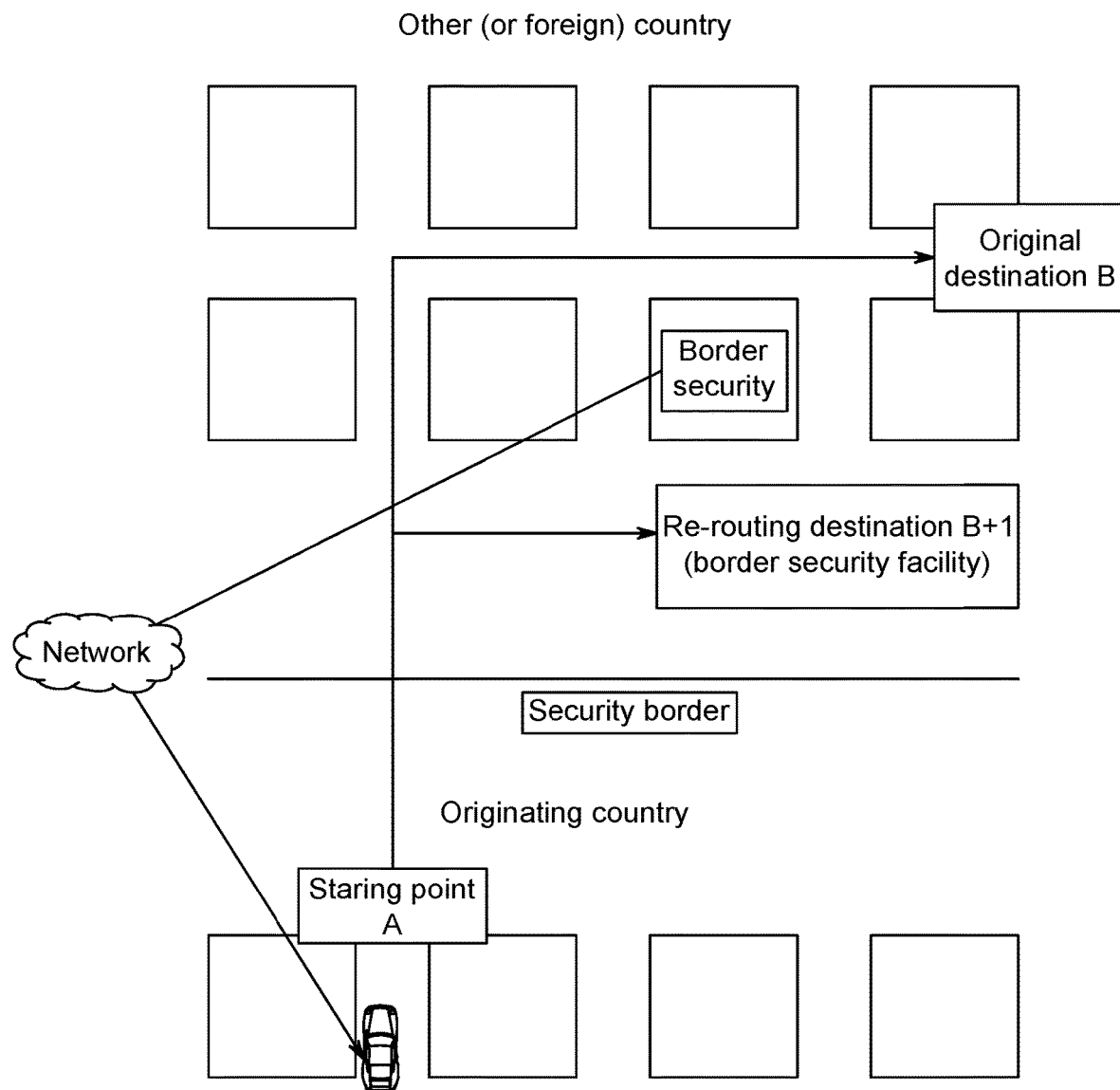
FIG. 1 is a diagram depicting an example of an implementation of a navigation method and system for an ADV that is utilizing navigation technology that relies upon data utilized by an on-board navigation system to route an ADV, according to some embodiments.

One or more embodiments of the present invention functions to generate routing information, mapping information, navigational information, occupant identification information, information containing items transported by an ADV, occupant state information, routes, reference information including a current position of one or more ADVs, timing information including current times to reach a current destination, etc., as described herein. One or more embodiments allows for the transmission, by one or more processors included in an ADV on-board computer and/or one or more control and system nodes 502, of the identification of the ADV occupants, the characteristics and description of the items within the ADV that may be transported across the secured border, a unique identification of an ADV (e.g., number, VIN, transmitted identifier, or any other structure used to differentiate one ADV from another), information concerning the trip, the physiological state of the ADV occupant(s), and any other requested information to a border security entity. For example, the border security entity can be any type of border security agency that secures any type of security border that is accessible to and can be crossed by an automobile or other vehicle traversing navigable pathways (e.g., borders between countries, facilities with heightened security, governmental agencies/buildings, parking lots and secure company grounds, or any other roadway or navigable pathway that leads to an area that requires authorization for entry for any purpose) before the ADV arrives at the border and/or the heightened security facility. In this manner, a border security agency can determine based upon its own internal procedures whether it requires or seeks elevated scrutiny of either or both of the ADV occupants or the ADV contents. Enabling a security agency to know with a high degree of confidence that the information that is received concerning ADV occupants and the relevant ADV contents is accurate will allow for the crossing of security borders (e.g., national borders) without additional security screenings will result in a costs savings to the security agency in that the agency will not have to waste resources in an effort to identify the ADV occupants, the ADV contents, request and access the nature of the trip, reasons for travel and other information that may be received by the agency at any time before the ADV reaches the secure zone. Additionally, allowing for the uninterrupted travel of one or more ADVs across secured zones, including international borders, will afford persons a more expedient, safer and more efficient mode of travel.

One or more embodiments of an autonomous driving vehicle (ADV) are described herein that are configured to autonomously drive one or more ADV occupants to a destination that resides on the other side of a security border. For example, with reference to FIG. 1, if one or more ADVs is programmed to navigate one or more routes that cross a security border of some kind (e.g., a route that has a starting point A that resides in an originating country and ends in another country, such as a foreign country to the occupants residing in the ADV, such that the ADV is autonomously navigated across a secured border), it can be the case that one or both of the originating country and/or the other country can have border security that operates to screen persons and/or vehicles leaving and/or entering the respective country. In this scenario, one or both border security organizations associated with the respective countries may want to know 1) the identification of the occupants riding inside the ADV (ADV occupants), 2) the state (e.g., physiological state) of the one or more ADV occupants, 3) the identification of any contents and the nature of the items residing in the ADV that are being transported across the security border, and/or 4) information concerning the ADV itself, and/or 5) the nature of the trip (e.g., why are the occupants riding together and/or what is the purpose of the trip, for how long is the trip, are the ADV occupants coming directly back, is there a person(s) that will be contacted, etc.).

Once a border security mode is initiated, information concerning the identification of the vehicle, the identification of the occupants residing in the ADV, information concerning the trip, information concerning the contents of the ADV, the current physiological state of the occupants, and other information concerning the trip is utilized to determine if a heightened screening of any one or more of the above is requested from a relevant border security agency. If the border security agency determines that a heightened security screening is not required, the ADV will be allowed to freely cross the security border and navigate its current route without interruption from the border security agency.

If, however, for any reason it is determined that a heightened security screening is required, the ADV will be automatically re-routed from its current geological location to a predetermined new geological destination that is a border security facility. The new geological destination can be wirelessly transmitted over a network to a relevant ADV, stored in an ADV on-board computer 204, and/or transmitted to an ADV over a network by one or more control and system nodes 502 that reside on the ADV control system network 610 and are communicatively coupled to the ADV via a network 608, as described with reference to FIGS. 6A and 6B. One or more embodiments of the present invention will utilize occupant sensor devices 208 to monitor the physiological state and detect an event that can be analyzed and factored into the decision to automatically re-route the ADV to a border security facility for a heightened screening. In one or more embodiments of the present invention, while one or more ADVs are functioning to autonomously navigate across a geographical network, one or more border security agencies can initialize a border security mode for the relevant ADVs that are currently navigating routes that will cross a security border that the respective border security agency is charged with protecting. In these embodiments, if the respective border agency decides at any time after the relevant border agency determines the identification of the ADV and the planned route (e.g., during a scheduling phase for the trip before the ADV occupants occupy the ADV, during a routing phase of the trip, at any time while the ADV is navigating the relevant route, and/or at any time wherein a relevant border security facility can communicate with the relevant ADV(s) to transmit or with one or more nodes 502 that reside within the ADV control system network 610 to have transmitted the necessary routing information such that the ADV can determine the new destination, determine a new route to reach the destination from the current geographical location of the ADV, and utilize the on-board computer 204 to automatically re-route the ADV to the relevant border security facility utilizing a dynamic routing algorithm that utilizes artificial intelligence to continuously determine the shortest pathway to reach the new destination from the current location of the ADV as described herein.

FIG. 1 illustrates at least a portion of an ADV navigation system (e.g., ADV 602) and generally illustrates one or more of its capabilities to generate a route for an ADV that includes a starting point A and a first predetermined destination B, use input data, sensed data, received data and/or other data to autonomously navigate an ADV from the geographical starting point A to the geographical destination point B, and automatically re-route an ADV using input data, sensed data, received data and/or other data to determine a new geographical ending point B+1 using a navigation system based upon one or more embodiments described herein. For simplicity sake, one ADV is shown performing routing and navigation operations on roadways provided within a single geographical area (e.g., a geographical area that includes portions of an originating country, a foreign country, a portion of a secured border separating the same and one or more navigable pathways crossing the secured border). However, one or more embodiments of the ADV navigation system network (described with reference to FIGS. 6A and 6B) can function to aide a fleet of one or more ADVs to, for example, route and navigate a plurality of ADVs throughout the same or different geographical areas on navigational pathways. In one example, ADV 602 includes a vehicle identification that may be utilized by the on-board navigation system to allow for the operation of the same. In other examples, the vehicle identification can be transmitted over a network 608 to a remote navigation service (RNS) that enables the RNS to check the status of the vehicle. In one or more embodiments, the vehicle identification can be transmitted over a network 608 to a border security agency as described with reference to FIG. 6B. The vehicle identification can include occupant sensory and/or identification data, data concerning a route and/or other navigation data, and/or sensory, navigation, control and/or any other data discussed herein concerning the vehicle, the route, and/or the occupants therein. Examples of the embodiments described below are applicable to a single ADV and a fleet of autonomous-driving vehicles and can generate routing information and navigate one or more ADVs across long distances, including between towns, cities, states, countries, etc. As shown in FIG. 1, an ADV 602 is being controlled by an on-board navigation system, embodiments of which are disclosed herein, to determine a route $R_N$ between starting point A and ending Point B and autonomously drive (i.e., navigate) the ADV from starting point A to ending point B along navigation route R (route R). In this example, ADV 602 is a passenger vehicle that is configured to autonomously move one or more persons along Navigation Route R using an on-board navigation system. In other embodiments, ADV 602 may be any vehicle that uses navigational pathways to navigate a geographical area.

An ADV 602 shown in FIG. 1 includes ADV sensors that can be used to collect data to navigate the ADV through its surroundings, sensors 208 used for collecting data about one or more vehicle occupants, sensors 220 that can be used to collect data about one or more items that may reside in an ADV, and an on-board navigation computer 204 that uses at least a portion of the data that is communicated via the aforementioned sensors in connection with other data to navigate (i.e., the ADV autonomously drives the ADV occupants) the ADV along a route R to a predetermined destination. For example, in one embodiment, one or more of the sensors described herein that are included in and/or associated with an ADV can be utilized to sense vital signs of one or more occupants of the ADV. The sensors can be configured to detect one or more vital signs including blood pressure, temperature, respiration rates and heart rates or other physiological states and/or data points. The sensors for detecting the vital signs or other physiological states and/or data points can either be non-contact sensors that can perform continuous and/or long-term monitoring of the occupant's vital signs, one or more wearable sensors that are attached to one or more vehicle occupants to perform continuous and/or long-term monitoring of an occupant's vital signs, or various combinations of non-contact sensors and wearable sensors to communicate an occupant's vital signs to the on-board navigation computer and controller.

For example, during and/or after the ADV has determined a route R that requires an ADV to cross a secured international border, the on-board computer 204 can wirelessly transmit information concerning 1) the identification of the one or more ADV occupants, 2) information concerning any items that are being transported within the ADV, 3) any other trip details (e.g., geological point of origin, geological destination, identification of persons to be visited, lodging information, length of stay, reason for travel, other countries to be visited, etc.) and 4) ADV identification information that identifies the ADV and/or characteristics concerning the same (e.g., functionality, year, make, model, VIN, insurance information, emissions information, etc.) to a border security agency. The security agency can, based at least in part upon the information requested and/or received, utilize its own methodologies to determine that heightened screening is required. In one or more embodiments, an ADV on-board computer 204 may also begin monitoring the physiological states of one or more ADV occupants using occupant sensors 208 and transmit the processed physiological state data to the relevant border control agency if a stress event, anxiety event or other event that may be utilized to determine if a heightened security screening is to be requested. For example, the one or more sensors 208 can monitor the vital signs of one or more ADV occupants while the on-board computer 204 is navigating the ADV along a route $R_N$ across a secure border. In one or more embodiments, if the on-board computer determines that one or more relevant vital signs and/or additional detections, occurrences, measurements, readings or sensed data concerning either the ADV or one or more ADV occupants is indicative of an event (e.g., stress, destress, anxiety, heightened awareness, panic attack, etc.), the on-board computer is programmed to automatically transmit this information along with any other information requested (during or before the trip) to a designated border control agency via a network 608 (as described herein with reference to FIG. 6B). Thereafter, the security agency 650 may determine that a heightened security screening is warranted.

In response to a heightened security request from the security agency 650, the ADV is automatically re-routed to a new geological destination $D_{N+1}$ that is, for example, a security screening facility or any other location wherein a security agency 650 may engage in a security and is reachable over navigable pathways. In one or more embodiments, the on-board computer 204 is configured to receive the new destination from the border agency 250 via network 608 with the requisite information such that the ADV is automatically re-routed and autonomously navigated upon a newly generated route (if applicable) to reach the designated screening area residing at the new destination. In one or more embodiments, one or more nodes 502 that reside in the ADV network 610 are communicatively connected via network 608 to the security agency 650 such that the new destination information is transmitted from the border agency 650 to the relevant ADV via one or more nodes 502 that are wirelessly connected to the ADV via network 608. In these one or more embodiments, the ADV identification may be utilized such that only the relevant ADV will receive the information to be utilized to re-route the ADV. In one or more embodiments, an on-board computer 204 is programmed with the destination $D_{N+1}$ that is associated with a particular border agency depending upon the particular border to be secured and, once a requests for heightened security is made, the CPU 302 will generate mapping information that will include the pre-designated security agency destination $D_{N+1}$ such that the ADV will be automatically re-routed to the new destination across navigable pathways using generated routing information utilizing the dynamic routing algorithm that utilizes artificial intelligence described herein. In one or more embodiments, a sensor is a sensor device that can be a system, an apparatus, a camera, any device that detects light to generate an image, an electro-magnetic device that utilized any form of electricity and magnetism to image, measure and/or detect a phenomenon, software, hardware, a set of executable instructions, an interface, a software application, a transducer and/or various combinations of the aforementioned that include one or more sensors utilized to indicate, respond to, detect and/or measure a physical property and generate data concerning the physical property. In another example, a sensor may be a transducer or any other device that measures weight (e.g., imperial system, metric system, international standards, pound, NIST, etc.), mass or a force.

Figure 2A:
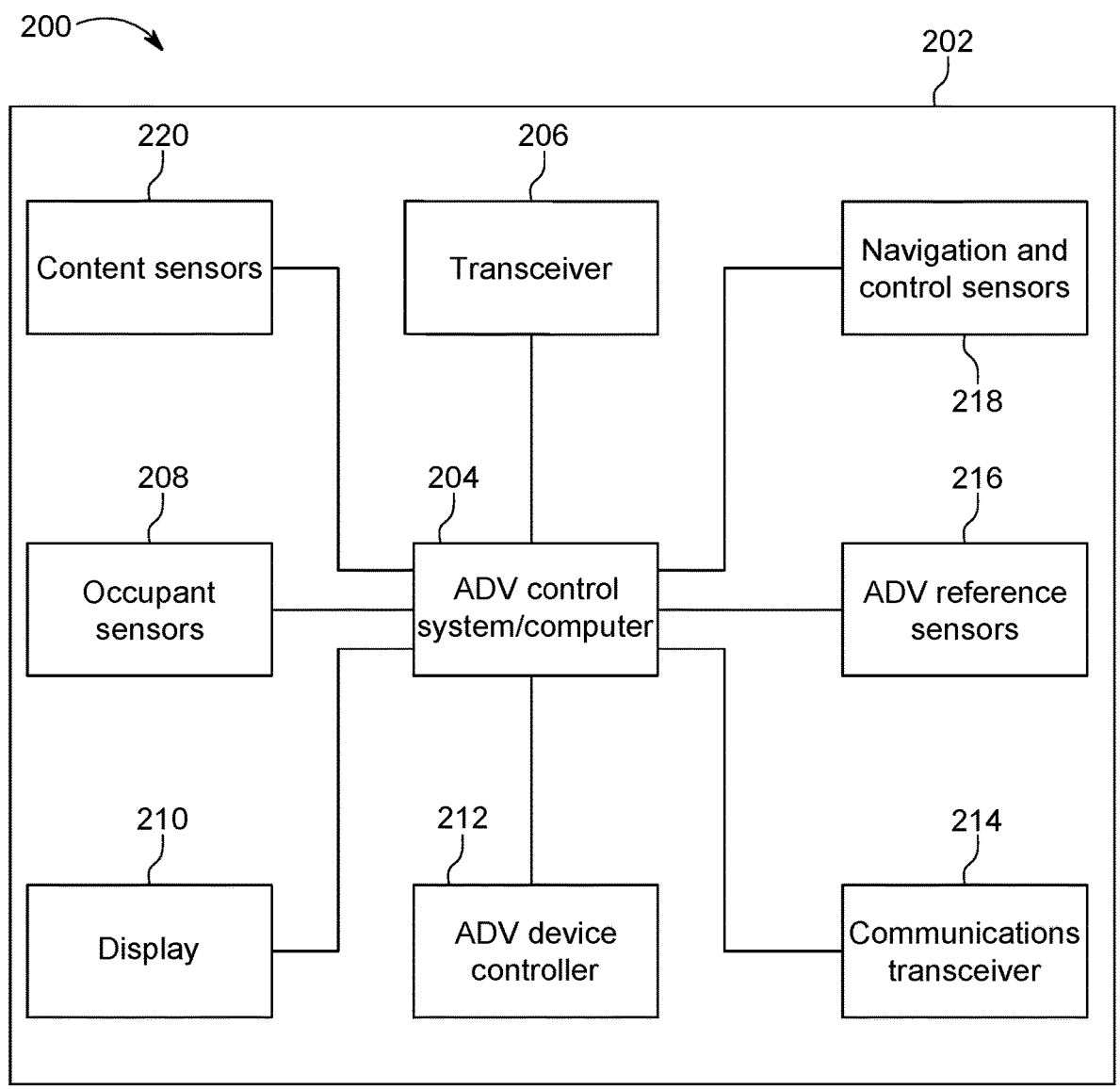
FIG. 2A is an example of a functional block diagram depicting a system including an ADV on-board navigation system that is utilized to control an ADV, according to some embodiments.
Figure 2B:
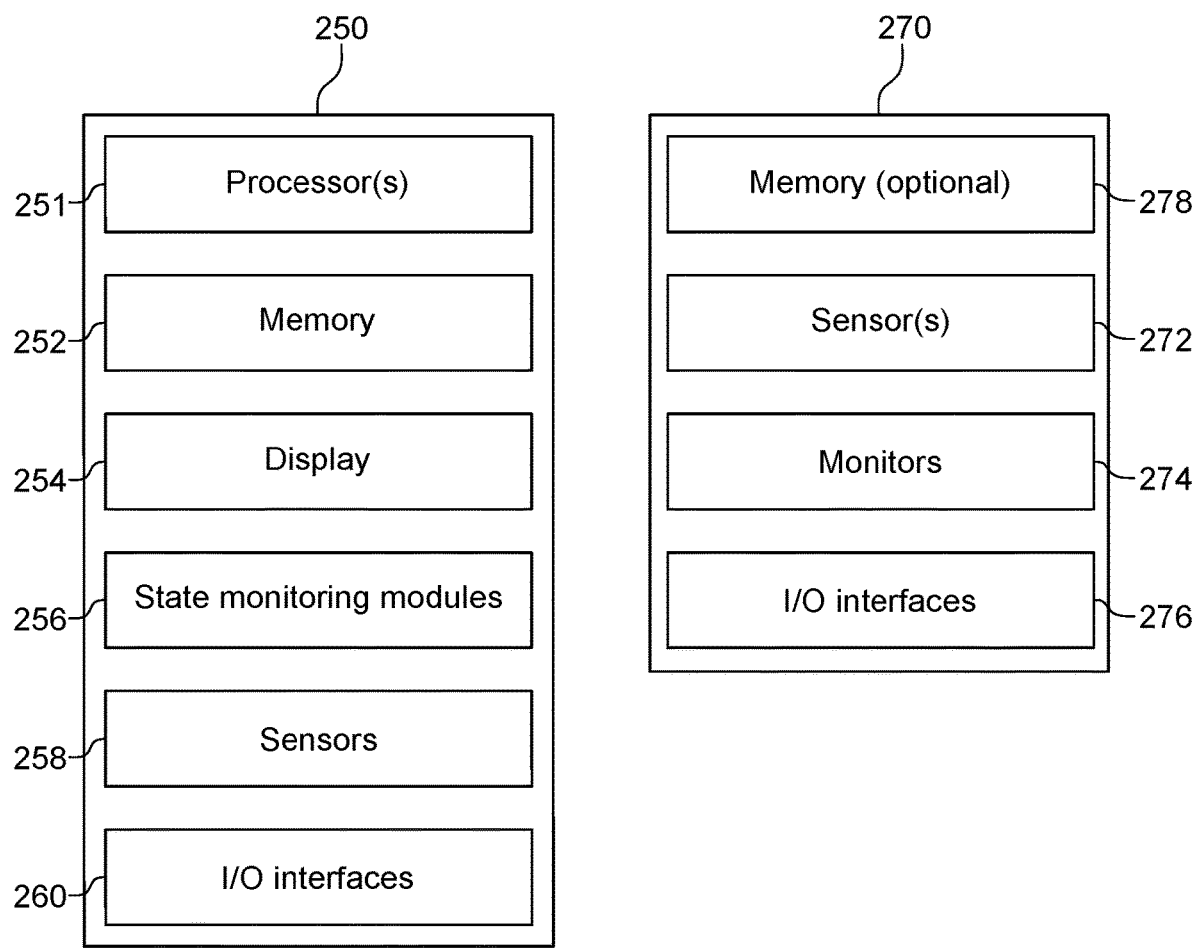
FIG. 2B is an example of a functional block diagram depicting an ADV occupant state and monitoring system that is utilized to monitor the state of one or more occupants of an ADV, according to some embodiments.
Figure 3:
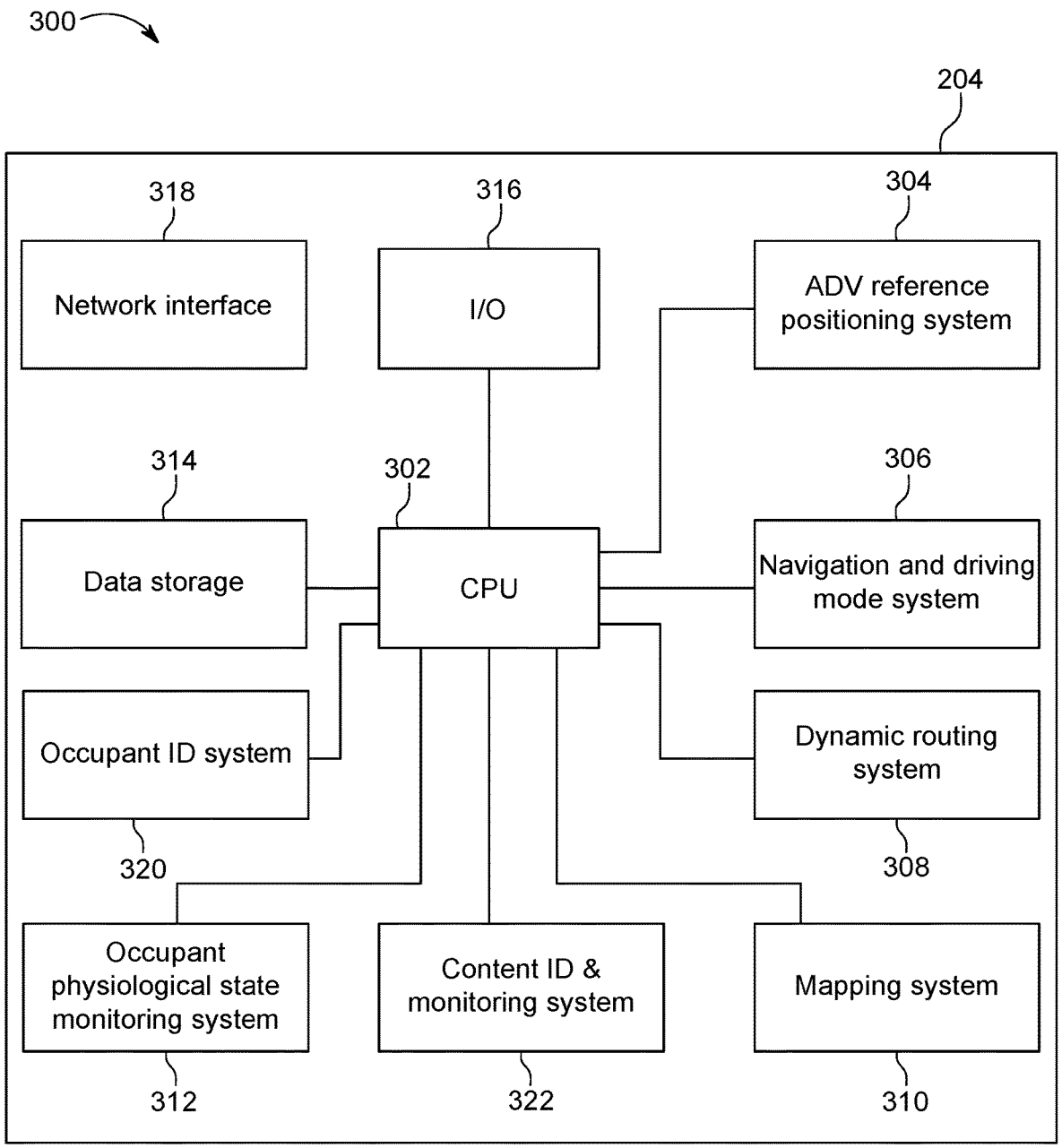
FIG. 3 is a diagram depicting an example of an architecture for an ADV control system and on-board computer, according to some embodiments.

FIGS. 2A, 2B and 3 are functional block diagrams of an embodiment of an on-board ADV navigation system 200 that can be used to route and navigate an ADV 602 generally shown in FIG. 1. As shown in FIGS. 2A-2B, each embodiment of an ADV described herein has an on-board computer and control system (on-board computer) 204 that operates to autonomously position and control an ADV to navigate the same from a geographical starting point A to a geographical ending point B without requiring an ADV occupant to accelerate, idle, engine-throttle, steer, brake, or warn (e.g., using a vehicle horn, wiper blades, hazard lights, or using a turn signal) another vehicle or pedestrian of an action that may somehow affect the other vehicle or pedestrian. The sensor data generated by the sensors described with reference to FIGS. 2A-2B will be processed by the on-board computer 204 described with reference to FIGS. 2A, 2B and 3 to autonomously navigate and control the ADV. The on-board computer 204 operates to among other things, for example, generate, determine and/or monitor 1) routing information that includes, when necessary, re-routing information, 2) navigational information to navigate an ADV from a geographical starting point to a geographical ending destination, and 3) sensor information that digitally describes an ADV's external surroundings, vehicular activities, and one or more of an occupant's physiological and current state. For example, an ADV's driving devices such as, for example, a steering wheel, a brake pedal, a gas pedal, a turn signal, a mirror(s), and a caution horn will be controlled by an ADV device controller 212 pursuant to control signals transmitted by the on-board computer 204 described with reference to FIG. 3. The on-board computer 204 communicates with the ADV reference sensors 216 and the navigation and control sensors 218 to receive the associated sensor data and processes the same to autonomously drive the ADV utilizing ADV device controller 212).

To assist the on-board computer 204 in navigating the ADV, the ADV reference sensors 216 generate sensor data (e.g., that generate sensor data concerning the direction the ADV is facing and the orientation of the ADV) that is processed by the on-board computer 204 via the ADV reference positioning system 304 to determine the geographical position and location of an ADV on the Earth's surface, a position which is correlated with a navigational map of a relevant geographical area via the mapping system 310 to enable the on-board computer 204, utilizing the dynamic system 308, to ultimately determine a route $R_N$ and additional routes $R_{N+M}$. For example, in one embodiment, a reference positioning system 304, described with reference to FIG. 3, is included within the on-board computer 204 and utilized to receive the sensor information generated by the ADV reference sensors 216 to generate positioning information that represents the location of the ADV on the Earth and, ultimately, on a map. The location information can include, for example, the direction the ADV 602 is facing and/or headed (e.g., the directions being the cardinal directions and ordinal directions), the ADV's orientation (e.g., angle of inclination and rotational position). In another embodiment, ADV reference system 304 can be a stand-alone device that generates positioning and reference data that may be input into on-board computer 204 utilizing one or more I/O ports 316 to program the CPU to perform the described functionality.

In one or more embodiments, maps generated by on-board computer 204 include mapping information such as navigable pathways that an ADV can navigate, the geographical location of geographical artifacts that are found along the navigable pathways and/or the relevant geographical region, artifacts including, for example, one or more of city streets, tolls, lights, bridges, highways, street cameras, structures, businesses, identified accidents or traffic jams, locations, etc. that may exists and are identifiable geographically within the relevant geographical area. For example, the on-board computer can query the database or utilize the in-memory processing system described herein to obtain the geographical location(s) of a certain type of geographical artifacts (e.g., border security agencies, border crossings, security and secure zones, businesses, residences, gas stations, schools, banks, arenas, ballparks, healthcare facilities, etc.) and receive a list of addresses or a display of the aforementioned relevant artifacts that appear on a map generated on a display 210 and referenced as a symbol or any other display device that can be used to visually represent one or more of the relevant geographical artifacts on the display 210. These geographical artifacts can reside in and span across different countries, states, cities, counties, and/or towns and geographical areas that are associated with the respective mapping information may span across secure borders (e.g., international borders).

In one embodiment, the positioning system can use a global-positioning system (GPS), the Quazi-Zenith Satellite System (QZSS), Beidou, Galileo, Globalnaya Navigazionnaya Sputnikovaya Sistema or Global Navigation Satellite System (GLONASS), or any other system that is accurate enough to determine the position of an ADV within the time and distance constraints such that the position can correlate with mapping information generated utilizing mapping system 310, be continuously updated, and fall within certain positioning distances such that navigation of the ADV 602 can be safely achieved while maintaining the accuracy of the routing information generated by utilizing dynamic routing system 308. Depending upon the size of the area to be navigated, Indoor Positioning System (IPS) can also be used as the other positioning systems described herein.

The ADV referencing sensors 216 can include sensors that measure the physical movement and orientation of the ADV, including but not limited to one or more accelerometers, geomagnetic field sensors, speedometers, etc. The current position of the ADV is continuously updated and used by the navigation and driving mode system, routing system and mapping system that are part of the on-board computer 204, described with reference to FIG. 3, to generate routing information and autonomously navigate the car along the generated route.

Navigation and control sensors 218 described with reference to FIGS. 2A-2B generate sensor data that is communicated to the navigation and driving mode system 306 that is utilized by the on-board computer 204 described with reference to FIG. 3. The navigation and control sensors 218 can include, for example, one or more infra-red sensors, gyroscopes, accelerometers, air flow meters, barometric sensors, vibrational sensors, electromechanical sensors, sensors that measure force, sensors that measure weight, and other sensors that may be utilized to measure physical movement, physical impact, distance, speed, direction, orientation (angle, rotation) and time. In another embodiment, one or more sensors that generate data concerning the positions of the steering wheel, one or more tires and/or steering column, and/or one or more sensors that read or utilize the data generated by the on-board speedometer an also be used by the navigation and driving system to navigate the ADV along a predetermined route. Navigation and control sensors 218 can also include sensors that detect roadway conditions (e.g., mud, water, snow, ice, potholes, gratings, uneven pavement, gravel, grass, lack of pavement, etc.) and the data generated by these sensors 218 can be used by on-board computer 204 via navigation and driving mode system 306 to control and navigate the ADV in a manner that is determined to be safe depending upon the sensed condition. Navigation and control sensors 218 that can be utilized to detect roadway conditions are vibration sensors, cameras, heat sensors, temperature sensors, moisture sensors, or any other sensor or sensors that can generate data that is indicative of a navigational pathway.

The navigation and driving mode system 306 can also use navigation and control sensors 218 to avoid obstacles along the route such as other vehicles, road obstructions (safety cones, construction, debris, etc.), pedestrians, hanging obstructions (e.g., bridges, tree limbs, light fixtures, etc.) and the like to safely navigate the ADV along a route. In this embodiment, navigation and control sensors can be one or more electromagnetic energy sensors such as radar and/or lidar, or one or more acoustic sensors such as, for example, sonar sensors, cameras that are used to detect traffic lights, stop signs, and any other structure or device intended to visually communicate information, or any combination of navigation and control sensors 218 described herein intended to effectively navigate the ADV along a route. The sensor data generated by one or more the aforementioned radar, lidar and/or sonar sensors described herein is used by the navigation and driving system to determine the distance of the relevant object from the ADV and navigate the ADV around the same if an action is required. The on-board computer 204 uses the continuously updated location information of the ADV and the sensor data generated from the navigation and control sensors 218 to navigate and control the ADV safely and effectively along a predetermined route in a manner such that the speed of the ADV is continuously monitored and controlled, the direction and orientation of the ADV is continuously monitored and controlled, traffic signs and warning signs are sensed and obeyed, and obstacles that are present along the route are safely negotiated by taking on more actions that safely avoid the obstacle (e.g., stopping the vehicle, going around the obstacle, increasing or decreasing the speed of the ADV, making the ADV perform a U-turn, or some other course of action to safely avoid the obstacle) while continuing to navigate the ADV to a geographical predetermined destination identified on a route generated by the on-board computer 204.

To assist border security personnel in identifying items that will be transported across a secure border, the ADV navigation system 200 includes content sensors 220. Content sensors 220 can include, in one or more embodiments, a camera device and/or a transducer device that converts the force of weight into electrical signals that can be processed by CPU 302 utilizing content ID and monitoring system 322 to determine the weight of each item occupying a relevant ADV. In this example, each of the suitcases, bags, backpacks, and/or other containers utilized to carry one or more items are imaged using one or more camera image sensor devices 220 and weighed using one or more transducer devices 220. The CPU 302 utilizing the content ID and monitoring system 322 associates each item with a unique ID, an image, and a weight total such that all of the following can be continuously updated if any of this data changes and continuously transmitted to a relevant border security agency 650 via a network 608 or via one or more nodes 502 using techniques described herein. Similarly, once an item is selected to be placed in one or more containers or, as the case may be, placed in the ADV without utilizing a container, each item is imaged and weighed, given a unique identification and processed in the same manner as the containers. In these examples, any discrepancy in the weight measurements anywhere along the route or any concerning images of items transported within an ADV can be utilized to make a determination as to whether a heightened security screening of the ADV is warranted.

In one or more embodiments, each ADV configured for cross security border travel may also be equipped with content sensor devices 220 that utilize magnetic induction tomography (MIT or electromagnetic induction imaging (EII)) sensor devices to obtain images of items enclosed within containers. These sensor devices 220 are non-radiating active sensors that do not utilize harmful radiation. In one or more embodiments, EII sensors 220 utilize eddy current density and the resultant secondary field to by applying an oscillating magnetic field to objects. The electromagnetic properties of the item to be imaged will determine the characteristics of the eddy current density and the secondary field. In this example, the CPU 302 will, via the content ID and monitoring system, map out the eddy current density by measuring the secondary field to obtain tomographic measurements constructed by varying the frequency of the applied field and, thus, varying the depth of penetration of the field into the item to be imaged. Weapons and other harmful devices may be detected using these aforementioned and other techniques. The processed images can be transmitted to a relevant border security agency 650 to utilize in its determination to re-route the relevant ADV and impose heightened security screening measures.

One embodiment of the ADV 602 uses occupant sensors 208, described with reference to FIGS. 2A, 2B and 3, to generate data that is received by on-board computer 204 to monitor various aspects of the physiological and well-being of one or more occupants residing within the ADV via the occupant physiological monitoring system 312. For example, the occupant sensors 208 can include sensors that measure one or more of an occupant's blood glucose level, blood pressure, temperature, heart rate, pulse rate, electrocardiograph (ECG) patterns, respiration rate, respiration effectiveness (e.g., blood oxygen saturation). In one embodiment, the occupant sensors 208 can be contact sensors, such as wearable devices that are attached to an ADV occupant. For example, the wearable device can include one or more contact sensors, embedded memory, a transceiver to transmit the sensor generated data to an on-board computer 204, and one or more processors to process the generated sensor data into measurements indicative of vital signs and/or physiological information concerning the relevant ADV occupants. The on-board computer 204 can be configured to receive the occupant sensor data from one or more occupant sensor 208 and utilize the occupant physiological monitoring system 312 to process the generated sensor data into measurements indicative of vital signs and/or physiological information concerning the relevant ADV occupants (physiological information), display information indicative of an ADV occupant's current physiological state, transmit the generated or received physiological information to one or more control and system nodes 502 (described with reference to FIG. 5) for further processing, and/or further process the physiological information and perform other functions with the measurements (e.g., re-route the ADV as described herein). In another embodiment, the occupant sensors can be contactless sensors that generate sensor data from contactless interaction with one or more occupants residing within the ADV and transmit the sensor data to the occupant physiological monitoring system to process the data into measurements and perform other functions with the measurements. In still another embodiment, the occupant sensors may be a combination of both wearable and contactless sensors.

To assist border security personnel in identifying one or more ADV occupants, the identification of one or more persons that will occupy the ADV when it will be autonomously navigated upon navigable pathways across one or more secured borders can be transmitted wirelessly to the relevant border control agency 650. In one embodiment, occupant sensors 208 can be one or more camera devices and one or more scanner devices that may be utilized to capture image data and document data to assist in establishing the identification of the one or more ADV occupants. The on-board computer 204 can be configured to receive the occupant sensor data from one or more occupant sensor 208 and utilize the occupant ADV identification image data via occupant ID system 320 to process the generated sensor data and generate images indicative of photographs and high-definition images concerning the relevant ADV occupants (image identification information), transmit the generated or received image identification information to one or more control and system nodes 502 (described with reference to FIG. 5) for further processing, and/or further transmission to a relevant border security agency to perform additional functions (e.g., re-route the ADV as described herein).

For example, a person's social security card, birth certificate, passport, driver's license, and/or other forms of identification including government issued identification (i.e., identification documents), can be imaged using one or more camera devices and/or scanner devices 208 such that the data can be processed by occupant ID system 320 and stored in the storage device 314 and/or wirelessly transmitted via network 608 to the relevant border control agency 650. In one or more embodiments, these identification documents may be wirelessly transmitted to one or more nodes 502 that can, in turn, transmit the same automatically or upon request to a border agency 650. If documents are utilized to establish the identity of the ADV occupants, camera image data may also be utilized and transmitted in real time to a border agency 650 using methods described herein to verify that the documents and the image data generated by the other occupant sensors 608 match (e.g., photographs and facial recognition data).

In one or more embodiments, occupant sensors 208 may utilize biometric identification techniques to both identify individual ADV occupants and determine if a heightened security screening should be requested. For example, in one or more embodiments, one or more sensors 208 utilize passive screening which captures the natural radiation emitted by individual ADV occupant bodies and analyzes the same to generate an image that can be utilized to verify an ADV occupant's identification. In these examples, the sensors 208 can include a passive millimeter wave scanner (mmW scanner) which is a scanner that is utilized to image a person's body for detecting objecting concealed underneath a person's clothing (e.g., a person's body, weapons, mobile devices, etc.). The mmW scanners 208 can be passive sensor devices that create images using only ambient radiation emitted from an individual ADV occupant. In this example, the CPU 302 is programmed utilizing the occupant ID and monitoring system 322 to process the captured sensor data and generate the image that can be compared to other data to confirm the identity of an ADV occupant or used to identify one or more items on the ADV occupant's person. One or more of these images can be transmitted to a relevant border security agency 650 using techniques described herein to be used to verify the identification of one or more ADV occupants. In other examples, occupant sensors 208 can irradiate ADV occupants with x-rays or millimeter waves, transmit the same to the CPU 302 such that the received image data (i.e., the scattered radiation reflected from an ADV occupant's body) can be analyzed via the occupant ID system 320 to generate one or more images that can be utilized to verify an occupant's identification using techniques described herein. These biometric sensors 208 can also be utilized to search for metallic weapons that are worn on a person such that border security agencies can determine if one or more ADV occupants are carrying weapons across secure borders (e.g., international borders).

In one or more embodiments, occupant sensors 208 can include other sensors for verifying an ADV occupant's identity that include smart cards that include embedded chips and/or processors that may be utilized to verify an occupant's identity. In other embodiments, sensors 208 can include finger print scanner/reader devices, palm print scanner/readers devices, hand geometry scanner/reader devices, wrist and hand vein pattern scanner/reader devices, facial pattern recognition scanner/reader devices, signature and/or handwriting analysis scanner/reader devices, voice recognition using a microphone (not shown), iris scanner/reader devices, and/or retina scanner/reader devices. For example, facial recognition sensor devices take pictures of ADV occupants' faces while they reside are in the imaging area of the sensor 208. In this example, one or more sensors 208 may utilize facial recognition to analyze the characteristics of an ADV occupant's face images input through a digital video camera 208 to measure the overall facial structure, including one or more distances between eyes, nose, mouth, and jaw edges, width of the nose, depth of the eye sockets, length of the jaw line and shape of the cheekbones. These measurements can be generated by CPU 302 utilizing occupant ID system 320 such that all of these measurements can be processed. For example, in one or more embodiments, a unique code is generated that is based upon one or more of these measurements that is unique to each individual scanned. In these examples, the code and/or the image can be retained in a database 656 (see FIG. 6B) and used as a comparison to another type of image or information when an ADV occupant is navigating a current route across a secure border to verify the identity of the ADV occupant.

In one embodiment, described with respect to FIG. 2B, one or more ADV occupants can wear one more occupant sensors 208 that are configured as an ADV wearable occupant sensor device 250 and one or more accompanying wearable sensor devices 270 to generate information that can be utilized to determine a physiological state of an ADV occupant at any time during a trip, information that may be taken into account by a border security agency 650 to determine if a heightened security screening should be requested. For example, an ADV wearable occupant sensor device 250 can be worn by itself, or in combination with one or more accompanying wearable sensor devices 270 that are configured to transmit sensory data and/or other physiological information, depending upon the state metric (e.g., vital sign, physiological state, etc.) to be measured, to the wearable occupant sensor 250. It is to be appreciated that occupant sensor device 250 is configured to work alone to monitor, capture and transmit sensory data and physiological data to an ADV on-board computer 204, and/or support a set of one or more wearable sensor devices 270 in monitoring and transmitting sensory data and other physiological data captured by wearable sensor devices 270 to an ADV on-board computer 204 for further processing. In one embodiments, wearable occupant sensor 250 is configured to be a watch that can be disposed on an occupant's wrist to monitor and store physiological sensory data using one or more of its sensors 258 and its memory 252. Either or both of the wearable occupant sensor 250 and the set of wearable sensor devices 270 can be configured as a wrist band, ring, ankle accessory, headband, glove, arm band, or sensing strip to be secured adhesively to an occupant's appendage or body surface.

In one embodiment, wearable sensor device(s) 270 includes a memory 278 that may be utilized to store data indicative of an ADV occupant's physiological state. In one or more embodiments, wearable sensor device(s) 270 is configured as a pass through device that transmits the sensor data to one or more wearable occupant sensor devices 250, or directly to an on-board computer 204 for processing via occupant state monitoring system 312. The measured sensory physiological data and/or sensor generated data is transmitted to an ADV on-board computer 204 that is communicatively coupled to occupant sensor device 250 via one or more interfaces 260. Occupant sensor device 250 can also include a display 254, one or more physiological monitoring modules 256, one or more sensors 258, and one or more processors 251 that, for example, 1) receive data from the one or more sensors 258, 2) execute instructions according to the one or more physiological monitoring modules 256, 3) generate physiological information utilizing the one or more physiological monitoring modules 256, 4)

receive information and data from a GUI that is part of a display device 254, and/or 5) transmit physiological information and data to the on-board computer 204 utilizing one or more transceivers. The occupant sensor device 250 includes one or more input/output interfaces that enable the communication of data over a wired or wireless network to an ADV on-board computer 204. For example, wearable occupant sensor device 250 and ADV wearable physiological sensors 270 may include one or more input/output interfaces 260 and 276, respectively, that include transceivers that are configured to both communicate with one another and/or an ADV on-board computer 204 via their compliance with one or more various standards that use wireless communication methods proposed by the Institute of Electrical and Electronics Engineers (IEEE), such as IEEE 802.11, IEEE 802.15, IEEE 802.16, and IEEE 802.20. IEEE 802.11 is a set of standard specifications for wireless networks, such as wireless LAN and wireless LAN including one portion of Infrared Communication and so on. IEEE 802.15 is a set of standard specifications for wireless Personal Area Network (PAN) including Bluetooth, UWB, ZigBee, and so on. It is to be appreciated that IEEE 802.16 is a set of standard specifications for wireless Metropolitan Area Network (MAN) (Broadband Wireless Access (BWA)) including Fixed Wireless Access (FWA) and so on. IEEE 802.20 is a set of mobile Internet standard specifications for wireless MAN (Mobile Broadband Wireless Access (MBWA)), just to name a few for exemplary purposes. In another embodiment, both occupant sensor device 250 and wearable physiological sensors 270 are configured to transmit, via one or more I/O interfaces 260, physiological sensory data and other information to an ADV on-board computer 204 using one or more wireless standards provided herein or through wired communication, for example wireless and wired USB standards, or use mesh transceivers to communicate over a mesh network with one another and on-board computer 204.

As will be described herein with reference to FIG. 2B, either one or both the occupant sensor device 250 and one or more wearable physiological sensors 270 can include one or more sensors 258, 272 for monitoring physiological sensory data and/or detecting one or more physiological conditions and/or various physiological states of an occupant. It is to be understood that because each of the physiological monitoring sensors 208 discussed herein can include one or more of wearable physiological sensors 270 and/or one or more occupant wearable sensor devices 250, in each instance where a particular sensor is discussed in relation to the occupant sensor device 250, the discussion is also directed to each of the one or more wearable physiological sensors 270.

In one embodiment, both the occupant sensor device 250 and set of wearable physiological sensors 270 are configured to continuously transmit the sensed data of one or more occupants at predetermined temporal intervals to an ADV on-board computer 204 once the device 250 and one or more sensors 270 are activated. In one or more examples, a border security agency can transmit a request to receive sensory data and physiological data concerning one or more ADV occupants at any time during a trip (e.g., within 10 miles of the border the agency is securing). In this example, one or more occupant sensor device(s) 250 and/or wearable physiological sensors 270 will detect and generate physiological data and transmit the same to on-board computer 204 to determine the physiological state of the relevant ADV occupant(s) and transmit the same to the border security agency via network 608. In one embodiment, the request for physiological data will be transmitted to one or more control and system nodes 502 that reside within ADV network 610, the request including the ADV identification (e.g., information that identifies the individual ADV vehicle 602 and which may also include the names and/or other identifying information of the one more ADV occupants and details concerning the trip). In this example, the requested information can be transmitted to the border agency directly from the relevant ADV vehicle 602 via network 608, or transmitted from ADV 602 to one or more control and system nodes 502 which, in turn, will transmit the requested information to the requesting border security agency. The requested and transmitted information can be configured in a form for easy processing, such as a document, spreadsheet, or any other format required by a border security agency.

For example, in one embodiment, occupant wearable sensor device 250 can include one or more sensors 258 for detecting movement (or the lack thereof) including a GPS sensor, an accelerometer, a gyroscope or any other type of motion sensor configured to generate sensor data that is indicative of movement. The lack of movement over a prolonged period of time or 'jerky' movements of certain monitored body parts by an occupant sensor 250 or one or more wearable physiological sensors 270 may indicate a physiological condition when the associated sensory data generated by one or more movement sensors is coupled with sensory data that indicates the relevant ADV occupant's heart rate. The occupant sensors 208, including the wearable sensor 250 and/or one or more wearable physiological sensors 270, may be configured to use any type of sensor configured to monitor stress, temperature, panic attacks, or any of an ADV occupant's vital signs and use one or a combination of one or more physiological metric measurements to confirm a current physiological state of the relevant ADV occupant.

In one embodiment, occupant wearable sensor device 250 can include a heart rate monitor that is configured to generate data concerning one or more heart rate measurements sensed in real time. In this embodiment, the ADV on-board computer 204 includes an occupant physiological monitoring system 312 that will be utilized to determine if, based upon the heart rate and/or other sensory data the relevant ADV occupant is currently experiencing heightened stress levels, nervousness, a panic attack, stroke, a heart attack, and/or is within a physical state that is approaching the same, all examples of an event. For example, the ADV on-board computer 204 and/or the occupant sensor device 250 will calibrate itself upon initialization to determine a baseline resting heart rate and use the same to determine what is considered to be a normal range for the relevant ADV occupant. Once the sensory data concerning the occupant's heart rate is received by the on-board computer 204, and/or the physiological monitoring module 256, the heart rate data will be processed to determine the necessary heart rate measurements of the relevant occupant. For example, the current heart rate of the relevant occupant may be compared with what has been determined to be a normal heart rate range via the initialization process, historical data that takes into account the relevant occupant's metrics (e.g., sex, age, weight, race, height, etc.) and the healthy heart rates of person's with similar physical and/or physiological and/or emotional attributes, and/or any other data that can be used to suggest the current state of the relevant ADV occupant when comparing the data against the ADV occupant's current physiological measurements.

For example, in one or more embodiments, the vital signs that can be measured by occupant sensors 208 include blood pressure, temperature, pulse, respiration, oxygen saturation, and pain levels. In one or more embodiments, the sensors 208 can be calibrated against historical data that indicates certain normal ranges for adults of a certain age, sex, race, weight, height, etc. For example, historical data may indicate the following: The normal ranges for blood pressure in adults are systolic pressure between 90 and 120 mm Hg (millimeters of mercury) and diastolic pressure between 60 and 80 mm Hg; The normal range for core temperatures varies from 97° F. to 99.6° F. (36.1° C. to 37.5° C.), with the average being 98.6° F. (37° C.); The normal range for an adult pulse is 60 to 100 bpm; The normal range for adult respirations is 12 to 20 breaths per minute; The normal $SpO_2$ range is between 96% and 100%; Pain is assessed using a pain scale of 1 to 10 for adults and a scale that includes a series of facial expressions for children. Using historical data and current measurements, one or more sensors 208 may be calibrated to determine the normal vital sign levels of one or more ADV occupants and, thereafter, utilize these calibrated levels to determine if an event has been detected.

For example, a border security agency may want to check the current physiological condition of one or more ADV occupants. In this example, based upon the calibrations of the one or more occupant sensors 208, an on-board computer 204 may receive heart rate readings that are between 88 and 100 bpm for an ADV occupant that was determined to have a normal heart rate at 80 bpm. If subsequent heart rate measurements continue to indicate these or similar higher heart rate readings for subsequent temporal periods, and/or if the heart rate readings are analyzed in combination with other physiological sensor data (i.e., physical agitation, nervousness, etc.), the cpu 302 is programmed via occupant state monitoring system 312 to indicate that the relevant occupant is having a stressful episode, nervous condition, panic attack, anxiety attack or another condition that is indicative of the detected data (i.e., event) and transmit the same to the requesting border control agency. All events and the sensor data associated with each event for one or more ADV occupants is logged and stored in storage device 314. In one or more embodiments, the on-board computer 204 is automatically programmed to transmit event information to one or more control and system nodes 502 for further processing. In one or more embodiments, event information is automatically transmitted to a relevant border security agency. For example, event information can be transmitted upon the occurrence of an event, within a predetermined distance of the secured border, or at periodic times during a trip.

A border security agency may also check for medical conditions (which are events) of one or more ADV occupants to determine if a heightened screening should be requested. For example, in the current example, based upon the calibrations of the one or more medical sensors, an on-board computer may receive a blood pressure reading that suddenly exceeds 180/120 mm Hg. In one example, when this reading is compared to a normal range or threshold, described above, the onboard computer will indicate that an event (i.e., myocardial infarction (i.e., heart attack)) has been detected. In another example, when this reading is compared to a normal range or threshold, described above, the onboard computer will compare this blood pressure reading to another taken a predetermined time later (e.g., 5 minutes or any other time period that may be utilized to affect the intended purpose of determining if an event has been detected) and, if the measurement is still outside of a predetermined range or below/above a predetermined threshold, indicate that an event has been detected. In still another example, the on-board computer will use the elevated reading and wait for another confirming measurement, such as chest pain (to be entered using a display 210 or using a display 254 on an ADV wearable occupant sensor device 250), shortness of breath, back pain (to be entered using a display 210 or using a display 254 on an ADV wearable occupant sensor device 250), difficulty speaking (to be monitored using a microphone (not shown) communicatively connected to the on-board computer), change in vision (to be entered using a display 210 or using a display 254 on an ADV wearable occupant sensor device 250), or any other one or more symptoms that accompany a heart attack. An event (e.g., shock, bradycardia, heart attack, heart failure, etc.) may also be triggered if a relevant ADV occupant's blood pressure is too low.

For example, if an ADV occupant does not have diabetes, historical data and calibration data can indicate that, for one or more ADV occupants, a fasting blood sugar level in the morning should be under 100 mg/dl, a blood sugar level before a meal should measure between 70-99 mg/dl, and a blood sugar level taken 2 hours after a meal (i.e., Postprandial) should have a measurement of less than 140 mg/dl. In one example, if an on-board computer determines, using one or more occupant sensors 208, that a relevant ADV occupant's blood sugar levels plummet to dangerous levels such that hypoglycemia is present, the on-board computer can determine that an event has been detected (i.e., hypoglycemia). In another example, if an on-board computer determines, using one or more occupant sensors 208, that a relevant ADV occupant's blood sugar levels have spiked above 400 mg/d (22.2 mmol/L), the on-board computer can determine that an event (e.g., Hyperglycemia, Hyperosmolar hyperglycemic state (HHS), or Diabetic ketoacidosis (DKA)) has been detected. In this example, one or more sensors 208 that can be utilized to measure blood sugar levels may be configured as a patch. For example, a FreeStyle Libre™ by Abbott may be utilized. In another example, a sensor that uses one or more of an ADV occupant's fluids (e.g., sweat, tears, saliva, blood, etc.) can be utilized to measure blood sugar and/or or glucose levels. One or more sensors that utilize light reflection, refraction and/or other light properties may be utilized to measure blood sugar and/or glucose levels.

Figure 4:
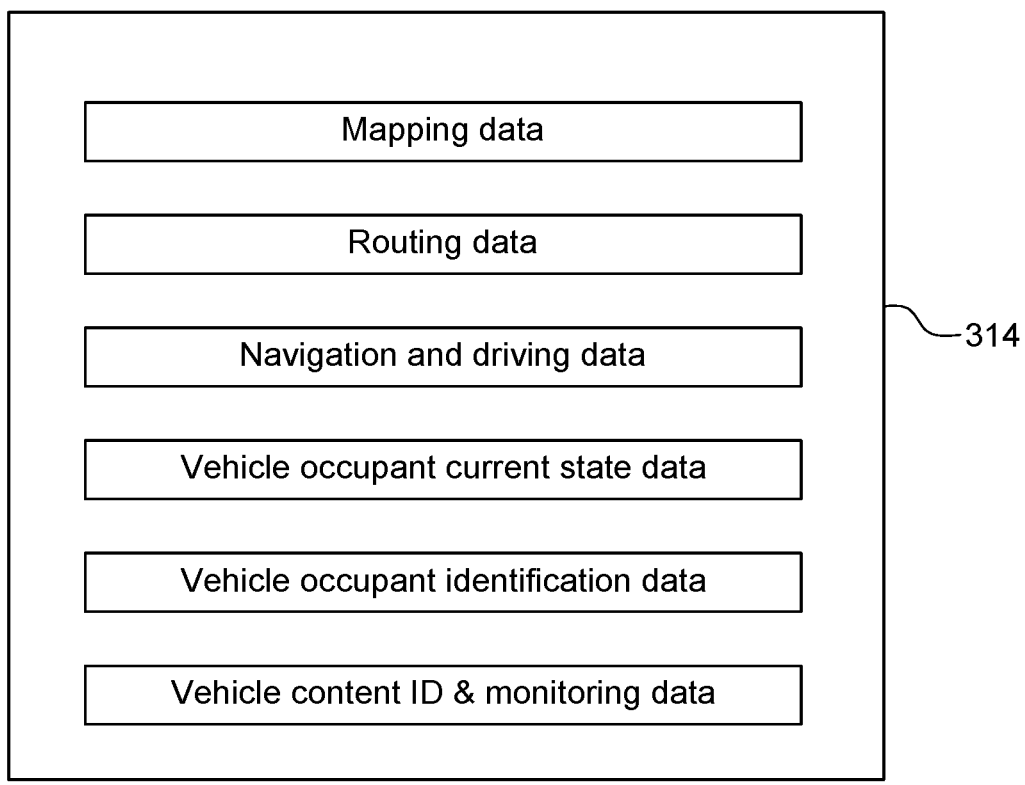
FIG. 4 is a diagram depicting an example of a memory architecture for an ADV control system and on-board computer, according to some embodiments.

As described in FIG. 4, data storage device 314 is utilized by on-board computer 204 to retrievably store all of the sensor data generated by one or more ADV sensor including, for example, occupant sensors 208, ADV content sensors 220, navigation and control sensors 218, ADV reference sensors 216, and any other data generated by any sensor, module, device, system, etc. that is utilized by on-board computer 204 to effectively and safely navigate ADV 602 as described herein. Although not illustrated, in one or more embodiments, data storage device 314 also stores the operating system for on-board computer 204, and one or more systems utilized by on-board computer 204 to perform the respective functionalities described herein, systems including the ADV reference system 304, navigation and driving mode system 306, dynamic routing system 308, mapping system 310, occupant physiological monitoring system 312, and or occupant identification system 320. Data storage device 314 is also configured to retrievably store mapping information associated with relevant geographical areas with which and within which the routing information (e.g., ADV geographical staring location(s) and geographical destination(s)) described herein is associated and geographically resides. In one or more embodiments, data storage device 314 may include one or more databases and/or have access to one or more databases (e.g., Microsoft SQL Server, MySQL, Oracle, relational database(s), multidimensional database(s), $DB_2$, OLAP cube database(s), multidimensional online analytical processing (MOLAP), etc.). As described herein, one or more embodiments of the on-board computer 204 includes an in-memory processing system configured to perform in-memory processing utilizing one or more processors and one or more RAM devices (not shown) to store all of the relevant data required to navigate the ADV and perform all of the functionality associated with on-board computer 204 described herein. In another embodiment, the entire contents of the data storage device 314 are retrievably stored in one or more RAM devices for efficient accessibility by the CPU 302. In one or more embodiments, CPU 302 can be one or more processors. In this example, one or more copies of all of the data stored in one more RAM devices are also stored in data storage device 314. The storage device 314 can be, for example, a non-volatile memory, read only memory (ROM), a flash memory, NAND flash memory and the like, or a magnetic disk device, such as a hard disk drive (HDD), and the like.

Figure 5:
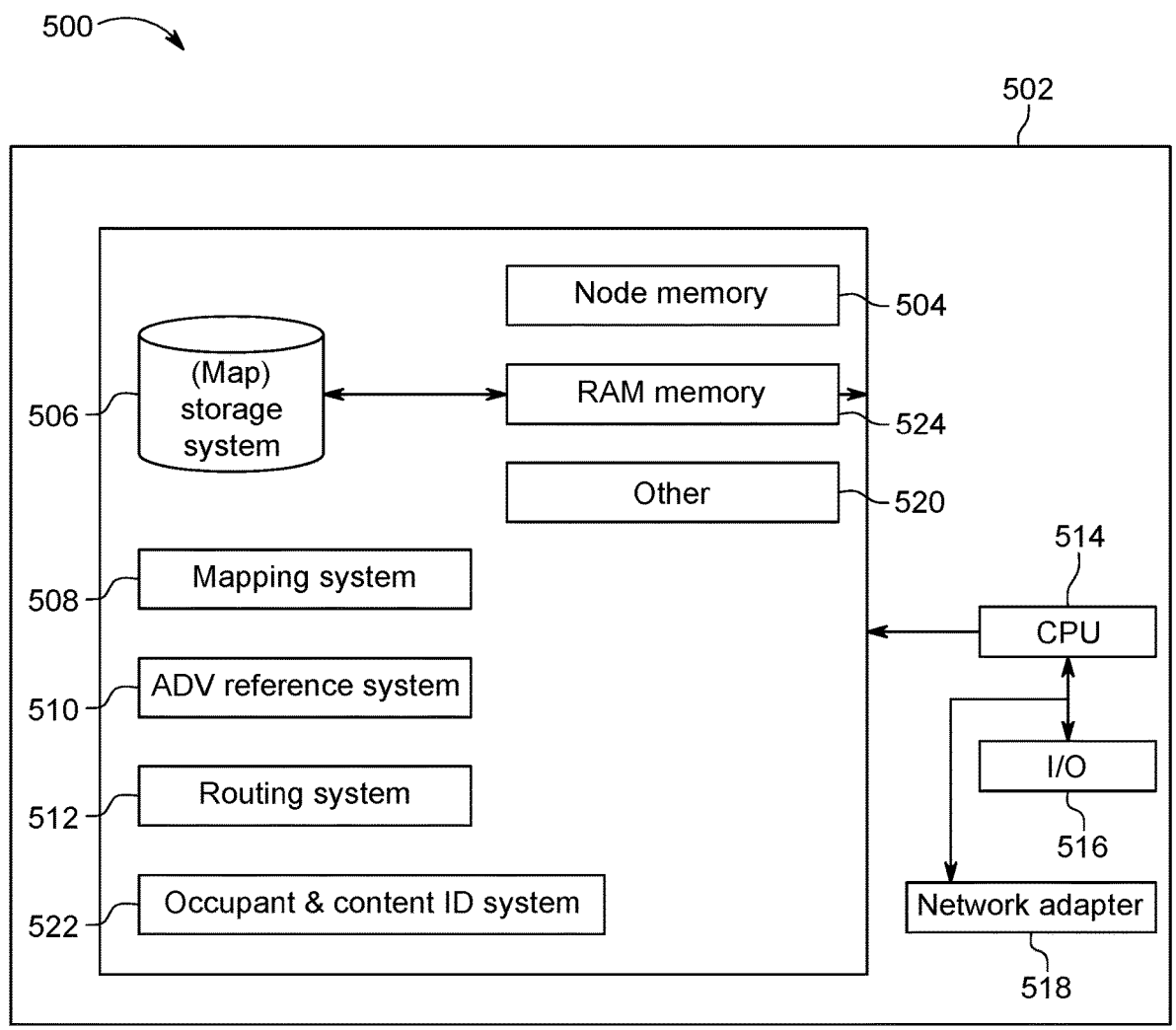
FIG. 5 is a diagram depicting an example of an architecture for an ADV control system computer node, according to some embodiments.
Figure 6A:
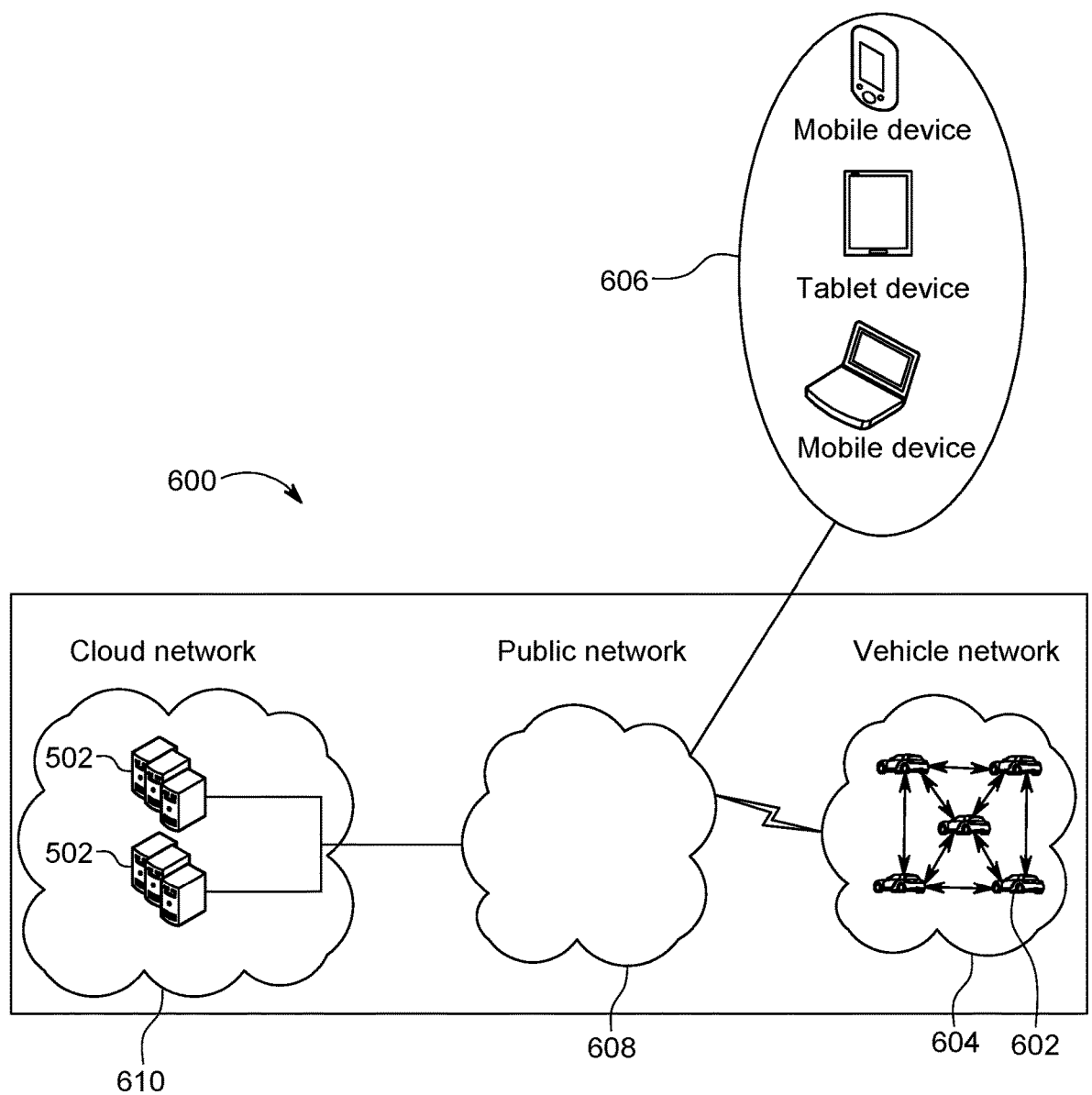
FIG. 6A is a diagram depicting an example of an ADV control system network platform, according to some embodiments.
Figure 6B:
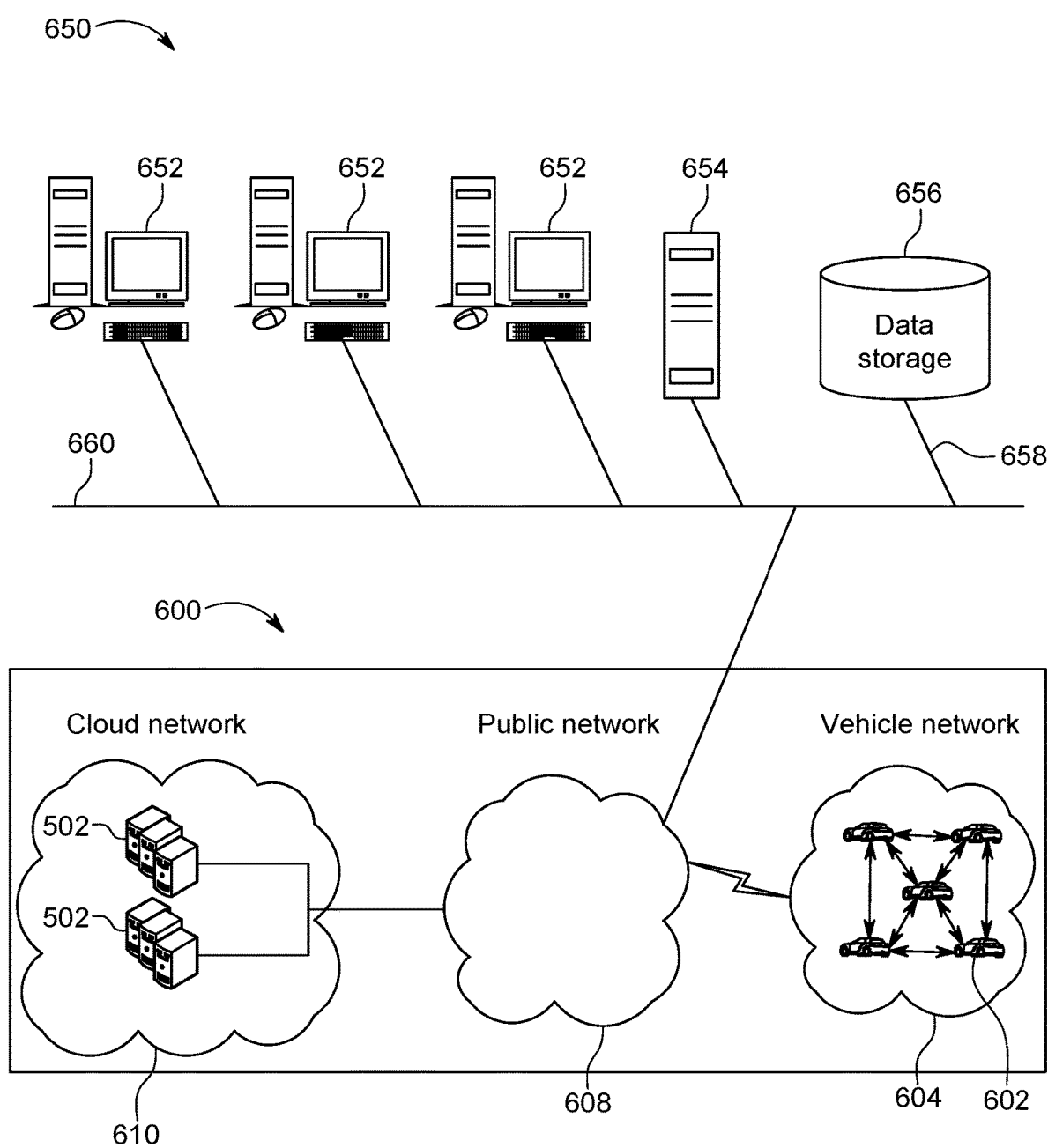
FIG. 6B is a diagram depicting an example of an ADV control system network platform capable of communications with designated border security facility, according to some embodiments.

ADV control system nodes 502, as described with reference to FIGS. 5, 6A and 6B, are configured as an ADV control system network 610 which is part of an ADV control network platform 600. One more control system nodes 502 that reside in ADV control system network 610 can be utilized by an on-board computer 204 to navigate an ADV in various ways including, for example, generating mapping and routing information, assisting in monitoring one or more ADV occupants, and facilitating communications with one or more border security agencies is described herein reference to FIGS. 5 and 6B. As described with respect to FIGS. 6A and 6B, one or more ADV control system nodes 502 may be configured in a ADV network service platform 600 that can be mapped to 1) a cloud network 610 protected by a firewall and 2) a management network that can be mapped to a public cloud network 608.

In one embodiment, mapping system 508, ADV reference system 510, routing system 512 and ADV occupant and content identification system 522 reside in node memory data storage 504 and can be configured, for example, as software, software applications, executable instructions to be executed by CPU 514, etc. In one or more embodiments, CPU 514 can be one or more processors. In one embodiment, storage system 506 included with ADV control system node 502 may also include one or more one or more databases and/or have access to one or more databases (e.g., SQL server, MySQL, Oracle, etc.) that store mapping information concerning large geographical areas, such as the United States, states within the U.S., foreign countries and other large areas such as the North American Continent, European Continent (e.g., geographical area that includes navigable pathways that cross international borders that are accessible by car). The map system 508 can retrieve mapping information from storage device 506 to generate one or more maps that include the relevant geographical areas of one or more routes generated by routing system 512 that may be utilized by one or more ADVs 602 to reach one or more predetermined destinations. The mapping information also includes geographical information and associated address information for structures (e.g., houses, businesses, governmental agencies, etc.) and points of interest (i.e., tollways, bridges, airports, amusement parks, etc.).

The on-board computers 204 that reside in the ADVs are also configured to receive mapping information and routing information, including routing instructions, from one or more nodes 502 that reside in the ADV network 610 and utilize this information to automatically navigate the relevant ADV. In some embodiments, the ADV control and system node 502 may reside on one or more (in the case of multiple nodes) application servers (not shown), and/or in a cloud network. Other configurations are within the scope of the present disclosure. With the aid of on-board computer 204, one or more nodes 502 may transmit one or a series (i.e., one or more) of navigable routes from the ADV's current position to one or a series of predetermined destinations (e.g., destinations that can be determined due to input by an ADV occupant utilizing a GUI (not shown), scheduled utilizing a laptop or desktop computer, received by an authoritative agency, and/or received by one or more nodes 502). The routing information can be utilized by one or more on-board computers 204 residing in one or more ADVs 602 in each of their mapping, route generation and navigation activities described herein with reference to FIGS. 7-10C. Each of the routes generated and/or obtained along with any information associated with each of the routes and/or navigable pathways included in any one of the routes may be stored in map storage database 506 for retrieval by the mapping system 508, ADV reference system 510, routing system 512 and/or occupant and content identification system 522 for use in assisting one or more ADVs.

In one or more embodiments, one or more nodes 502 that reside in ADV control network 610 may use social networking to build and update mapping information and routing information utilized to generate navigational routes as described herein. For example, users may communicate with one or more nodes 502 and other components of the ADV control network platform 600 (e.g., ADVs 602) using mobile devices 606 over a network 608. Examples of mobile devices 606 include, but are not limited to, mobile phones (e.g., a smartphone), personal digital assistants, and tablet computers and other types of mobile devices 606 are within the scope of the present disclosure. Mobile devices 606 may communicate with the ADV control network platform 600 via a communication network 608. Examples of mobile devices 606 that may be used to communicate data and information concerning the navigation of one or more ADVs over a network 608 include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on.

As described herein, if an on-board computer 204 does not have enough mapping information to generate a route from its current geographical position to an identified destination, either because the mapping information does not contain the current position of the ADV, the identified destination of the ADV, or one or more navigable pathways that are between the aforementioned current position and the identified destination, the on-board computer 204 may transmit a request to one or more ADV control system nodes 502 that reside in the ADV control network 610 to receive the required mapping information. For example, the on-board computer 204 may utilize the mapping system 310, the dynamic routing system 308 and the ADV reference system 304 to use the transmitted information to generate the current geographical position of the ADV, the identified geographical destination, and one or more routes to navigate the ADV along to reach the destination. In some embodiments, one or more ADV control system nodes 502 will determine the current position of the ADV, the identified destination of the ADV, one or more navigable pathways that are between the aforementioned current position and the identified destination, and generate one or more routes for the ADV to reach the destination and transmit the same to the on-board computer 204 for either use by and/or confirmation of the on-board computer 204 generated information. In one embodiment, an ADV occupant or another user of the ADV system may enter a destination using a GUI on display 210. In another embodiment, an ADV can be provided with one or more destinations using one or more mobile devices 606 or via a desktop computer that transmits information to the ADV system network 610 that includes scheduling information (e.g., time, date, etc.), destination information (address, etc.), and occupant ID information (name, age, address, etc.). In one or more embodiments, a relevant border agency can transmit destination information and scheduling information to one or more ADVs 602 directly to the one or more ADVs over network 608 or via one or more control and system nodes 502 that reside in ADV platform network 610. For example, destination information can be transmitted by one or more nodes 502 residing in the ADV network 610 to one or more ADVs that will, in turn, automatically generate routing information from the current location of the ADV and transport known ADV occupants to one or more predetermined destinations. Additionally, the destination and scheduling information can be utilized by an on-board computer 204 to automatically deliver the relevant ADV occupants to the predetermined destination at a specific time (e.g., a relevant border agency facility at a specific time) if possible under the time, navigational, speed and environmental constraints.

The ADV control system utilizing one or more control nodes 502 may determine the current position and/or a starting position of an ADV to assist in the generation of routing information in a similar manner as described with the on-board computer 204 herein. For example, the ADV network may utilize an ADV reference system 510, shown in FIG. 5, included within one or more control system nodes 502 to represents the location of the ADV on the Earth and, ultimately, on a map. For example, ADV reference system 510 can use a global-positioning system (GPS), the Quazi-Zenith Satellite System (QZSS), Beidou, Galileo, Globalnaya Navigazionnaya Sputnikovaya Sistema or Global Navigation Satellite System (GLONASS), or any other system that is accurate enough to determine the position of an ADV within time and distance constraints such that the position may both correlate with mapping information, be continuously updated, and fall within certain positioning distances such that navigation of the vehicle can be safely achieved while maintaining the accuracy of the routing information. In another embodiment, the starting location may be transmitted via mobile devices 606, entered using a GUI included in display 210, or otherwise provided to an on-board computer 204.

As described herein, mobile devices 606 may be utilized within the ADV network platform 600 to provide information about one or more navigable pathways by transmitting the same over a public network 608 to one or more control system nodes 502 residing in the ADV network 610. For example, some of the mobile devices 606 are equipped with imaging systems such that visual information (e.g., pictures, videos) may be transmitted to one or more nodes 502 or one or more on-board computers 204 that reside in ADVs 602, or both. Utilizing the ADV reference system 508 that resides in one or nodes 502, and the ADV reference system 304 that resides within on-board computer 204, the image data may be compared with historical image data that resides in the storage system 506 and/or the data storage 314 to determine the location of the image information. Once the geographical location is determined, the information may be used to update route navigation times due to circumstances surrounding the navigable pathways (i.e., accidents, road obstructions, environmental occurrences, etc.), determine one or more of a destination or a current position, or other information that affects routing and positioning. In some instances, the image data itself will include metadata that includes positioning and other information that may be utilized in a manner to determine and generate routing, mapping and route updating information. Historical information that can be used to generate and determine information concerning positioning, routing and mapping of one or more of the ADVs is stored in storage system 506 or other databases for retrieval by one or more nodes 502 to assist one or more ADVs to navigate generated routes as described herein. With respect to FIGS. 6A and 6B, one or more ADV control system nodes may be configured in a ADV network service network that can be mapped to a cloud network 610 protected by a firewall and a management network that can be mapped to a public cloud network 608.

Figure 7:
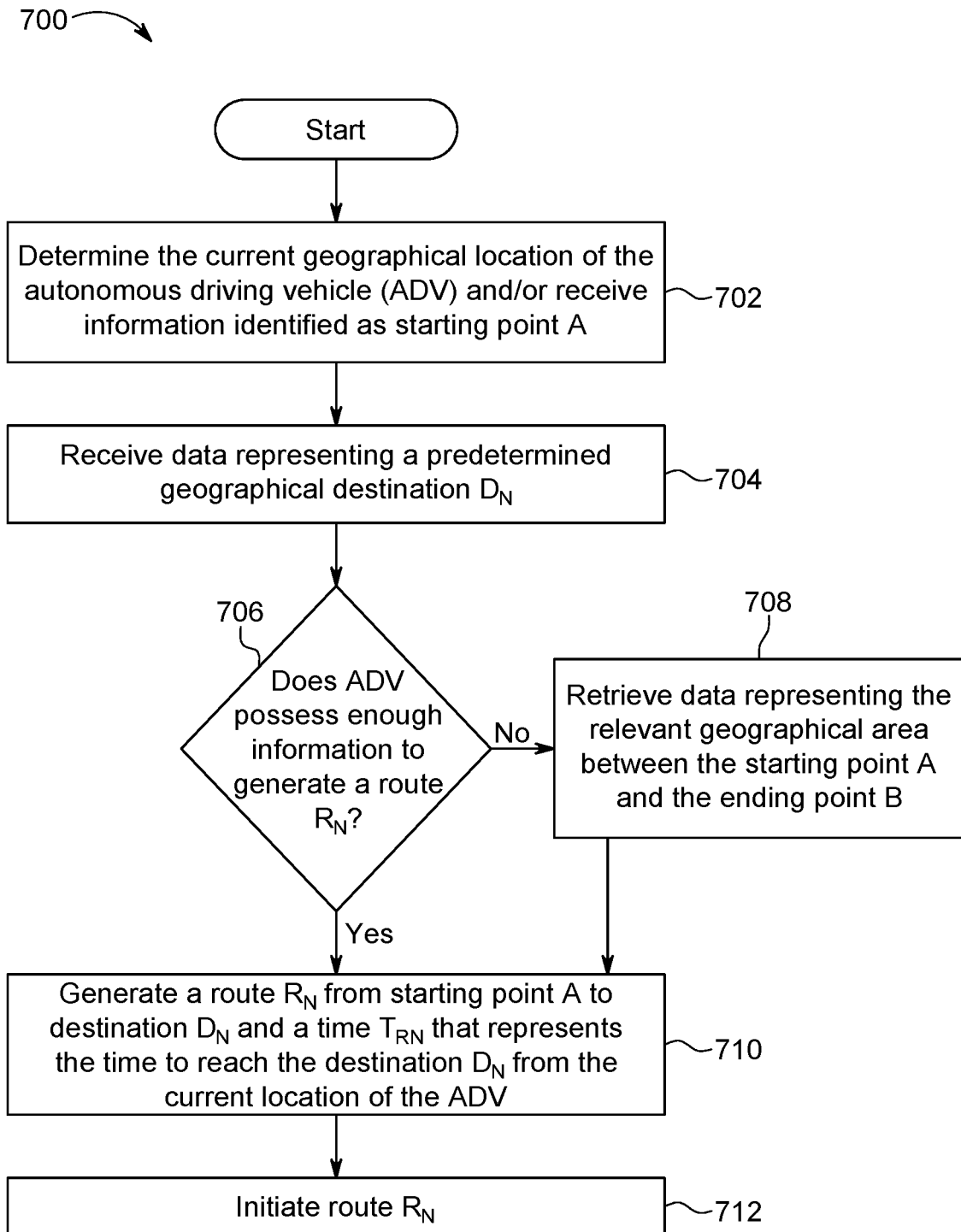
FIG. 7 is an example of a block diagram including a flow chart of one or more steps performed by one or more processors and/or other devices to route an ADV based upon sensor data, navigation data, and/or other data provided to the processor(s), according to some embodiments.
Figure 8:
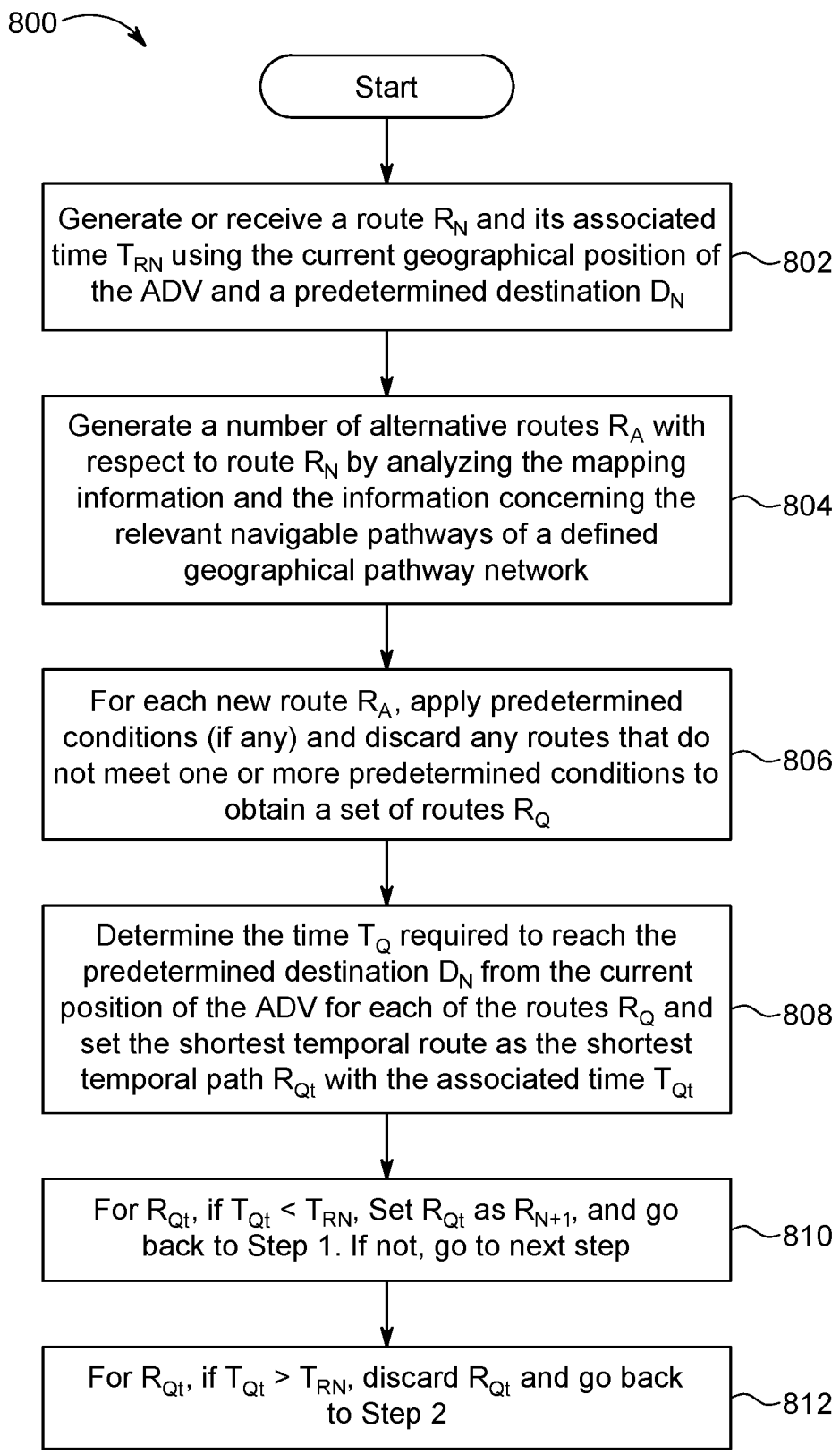
FIG. 8 is an example of a block diagram including a flow charts of one or more steps performed by one or more processors and/or other devices to alter a previous navigation route stored and/or undertaken by an ADV based upon sensor and/or other data received by the processor(s), according to some embodiments.

FIG. 7 is a flowchart 700 that will be referenced to describe an algorithm for determining and generating a route $R_N$ using an ADV's current location to a predetermined destination $D_N$ and autonomously navigate the ADV along the route $R_N$ in accordance with one embodiment. At step 702, the current geographical location of the ADV is identified. In one embodiment, the on-board computer 204 utilizing the ADV reference system 304 determines the current geographical position of an ADV using techniques described herein. In another embodiment, one or more control system nodes 502 that reside in the ADV network 610 may be utilized to determine the current geographical location of the ADV using one or more techniques described herein. In another embodiment, one or more mobile devices 606 may be utilized to determine the current geographical location of an ADV using one or more techniques described herein.

At step 704, the on-board computer 204 receives data representing the predetermined destination $D_N$ that represents an ending point B and determines the associated geographical location of destination $D_N$ utilizing mapping information generated by the mapping system 310. As described herein, the destination $D_N$ may be 1) selected by an ADV occupant or third-party (e.g., border security agency or other governmental or authoritative agency, authorized user of the ADV platform 600), 2) transmitted to one or more nodes 502 using a mobile device or desktop computer and, thereafter, transmitted to the relevant ADV, 3) entered into a display 210 by an ADV occupant utilizing a GUI (not shown), 4) transmitted using one or control and system nodes 502 over a network 608 to on-board computer 204, and/or 5) otherwise selected such that on-board computer 204 receives the destination $D_N$.

At step 706, the onboard computer 204 utilizing the mapping system 310 and the data storage 314 determines if there is enough information to generate a route $R_N$ from the starting point A to the predetermined destination $D_N$. As described herein, the mapping information is used to determine the navigational pathways from a starting point A (e.g., a predetermined geographical location, or the current geographical location of the ADV) to the destination $D_N$ so that a time $T_{RN}$ that represents the time that it will take the ADV to autonomously navigate the ADV along the navigational pathways from the starting point to the destination $D_N$. Knowing the geographical positions of all of the navigational pathways between starting point A to the predetermined destination $D_N$ allows the on-board computer 204 and/or one or more nodes 502 residing in the ADV network 610 to analyze historical data and/or data transmitted in real time to determine if one or more occurrences (e.g., traffic, accident, environmental hazard, draw bridge activity, tollways, road work, etc.) will impede the ADV from navigating one or more pathways included in the current route $R_N$ to reach a destination $D_N$ and thus impact the time $T_{RN}$. Additionally, analyzing each of the navigable pathways with respect to the current position of the ADV, the current direction of the ADV and/or the direction the ADV is traveling along a navigable pathway allows for a more reliable calculation of the time $T_{RN}$. If the on-board computer 204 determines that there is not enough information at step 706, as described with reference to step 708, the on-board computer 204 transmits a request to one or more control and system nodes 502 in the ADV network to either 1) receive the necessary information to generate the mapping information and/or the route $R_N$, 2) receive both the mapping information and the route $R_N$, or 3) receive both 1) and 2) and use the information from 2) to confirm the mapping and/or route information generated in 1). If the on-board computer 204 determines that there is enough information at step 706, the on-board computer 204 generates a route $R_N$ and a time $T_{RN}$ at step 710 and automatically initiates the route at step 712 to autonomously navigate the ADV to the destination $D_N$ from the ADV's current position.

In one embodiment, an on-board computer 204 and/or one or more of the system control nodes are programmed, via the dynamic routing system 308 in case of the on-board computer 204 or via the routing system 512 in case of the one or more control nodes, to execute a dynamic routing algorithm that utilizes artificial intelligence to continuously generate the shortest temporal route from the ADV's current position to a predetermined destination $D_N$ based upon information concerning the navigable pathways in the relevant geographical region. The dynamic algorithm will now be described with reference to FIG. 8. which represents a flow chart of the algorithm. According to one embodiment, an ADV on-board computer 204 and/or one or more system control nodes 502 are programmed to utilize a dynamic routing algorithm to perform dynamic routing using artificial intelligence (AI) to generate and determine the shortest temporal route that an ADV will navigate from a geographical starting point (e.g., the current location of the ADV or another predetermined geographical location) to a geographical ending point (e.g., a predetermined destination $D_N$ or another predetermined geographical location). Depending upon the size of a geographical region to be traversed and the amount of information gathered concerning the navigable pathways within the geographical region collected, either a single ADV can perform dynamic routing using artificial intelligence (AI) to generate a route $R_{N+1}$, or an ADV system network 610 that utilizes one or more ADV control system nodes 502 can be utilized by an on-board ADV computer to perform dynamic routing using artificial intelligence (AI) to generate a new route $R_{N+1}$.

For example, if the on-board computer 204 determines that the mapping information stored in the data storage and generated utilizing the mapping system does not contain enough information concerning any one or more navigable pathways included in the new route $R_{N+1}$, the on-board computer 204 can communicatively couple to one or more control system nodes 502 included in the ADV system network 610 via network 608 and receive the required mapping information to generate a new route $R_{N+1}$ and perform the dynamic routing algorithm. The dynamic routing algorithm is initialized utilizing the dynamic routing system concurrently with the generation or the receipt of a route $R_N$ or at any point during the navigation of the route $R_N$ by the ADV. As described herein with reference to step 802, the on-board computer 204 determines the current geographical location of the ADV and the total time $T_{RN}$ that it will take from the ADV's current geographical location to reach the current predetermined location $D_N$. As described with reference to step 804, the on-board computer 204 uses the reference system, the dynamic routing system and the mapping system and analyzes 1) the mapping information generated by the mapping system, 2) data and/or other information transmitted to the on-board computer 204 over a network, 3) historical data stored in the on-board computer 204 data storage and/or the data storage of one or more control system nodes 502 transmitted to the on-board computer 204, if available, to generate a number of alternative navigable routes $R_A$ from the ADV's current position to the predetermined destination $D_N$.

For example, in one embodiment the on-board computer 204 uses the mapping system and the ADV reference system to automatically generate a set number of alternative routes $R_A$ in addition to the current route $R_N$ when the route $R_N$ is initially generated. The routes $R_A$ may be generated based upon a weighted system that utilizes time, distance and/or navigable pathway conditions.

For example, in one embodiment, using the total navigable distance associated with a current route $R_N$ measured from the ADV's current position on the route $R_N$ to the current predetermined destination $D_N$, the on-board computer 204 can also generate a number (e.g., ≤N (which can be any number depending upon the number of routes available and the available system processing resources)) of alternative routes $R_A$ that are within (higher and lower) a navigable distance (e.g., ≤N≥ (which can be a % of the reference navigable distance or some other number)) of the reference navigable distance (defined by the distance from the current location of the ADV to the predetermined geographical destination $D_N$).

Another embodiment generates a number of alternative routes $R_A$ an ADV can navigate from the ADV's current position to the predetermined destination $D_N$ as described in step 804 by using a weighting system that uses historical data that includes the average times required to traverse one or more known previously stored routes that align with or most closely align with the current route $R_N$. In this example, as described herein with reference to step 802, each route $R_N$ generated or received by the on-board computer 204 or by one or more control system nodes 502 has a total time value $T_{RN}$ associated therewith that is a temporal measure based upon the total distance of the route $R_N$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the route $R_N$—e.g., navigable pathway information). For example, the time $T_{RN}$ for the route $R_N$ is continuously updated in the manner described herein and saved as the ADV navigates current route $R_N$ such that the $T_{RN}$ represents a current theoretical temporal measure of the total time it will take the ADV to reach the current destination $D_N$ from the ADV's current position based upon the information described herein. In one embodiment, as described with respect to step 804, for each route $R_N$ received or generated, a series of historical routes $R_H$ are automatically generated based upon certain criteria. For example, historical routes $R_H$ that match or most closely match the route $R_N$ are selected by comparing the total time value $T_{RN}$ with a total time value $T_{RH}$ (total time to traverse a relevant historical route from the current geographical position of the ADV) that is similarly associated with each $R_H$ and determined in one or more ways consistent with that of time $T_{RN}$. In one embodiment, the on-board computer 204 and/or one or more control system nodes 502 determines if the time $T_{RH}$ is within a predetermined temporal range of time $T_{RN}$. For example, the temporal range may be any range (higher or lower) (e.g., $\leq T_{RN} \geq$ (which can be a % of the reference navigable time $T_{RN}$ or some other number)) as long as it is suitable to identify a number of relevant historical routes $R_H$ for the purpose described herein. Each historical route $R_H$ is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route $R_H$ or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If stored on one or more control system nodes 502, the historical routes $R_H$ may be transmitted to the on-board computer 204 for processing. Once a set of historical routes has been determined using one or more techniques described herein and/or other known techniques, each historical route $R_H$ will be added to the list of alternative routes $R_A$ and associated with a current route $R_N$. In one embodiment, for each route $R_A$, a total time value $T_{RA}$ that represents the total time to traverse the route $R_A$ from the current geographical position of the ADV that is similarly determined for the current route $R_N$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes $R_A$.

In one embodiment, the on-board computer 204 can also rely upon information and data transmitted by one or more mobile devices 606 that are connected to the ADV system platform 600 over a network 608 to calculate, update and/or obtain information that may impact the total time value $T_{RH}$ of one or more historical routes $R_H$, total time value $T_A$ of one or more alternative routes $R_A$ and/or obtain information that may be utilized to calculate and/or update the $T_{RN}$ for a route $R_N$ upon which an ADV is currently navigating. Information that can be transmitted by one or more mobile devices 606 includes, for example, average speed of vehicles on one or more navigable pathways that are included within one or more of the routes $R_N$, $R_H$ and/or $R_A$, historical information concerning time(s) to traverse the entirety of one or more of the routes $R_N$, $R_H$ and/or $R_A$ or one or more navigable pathways included within any one or more of the routes $R_{N+1}$, $R_H$ and/or $R_A$, speed limit of one or more navigable pathways within any one or more of the routes $R_{N+1}$, $R_H$ and/or $R_A$, roadway obstructions, accidents, conditions of one or more navigable pathways within any one or more of the routes $R_N$, $R_H$ and/or $R_A$, time of day, day of the week, or any information that can be used to determine and/or update the measurements of the times $T_A$, $T_H$ and/or $T_{RN}$ to traverse the routes $R_A$, $R_H$ and/or $R_N$. In this example, that will be described with reference to FIGS. 6A-6B, the mobile devices 606 will connect to one or more control system nodes 502 over a network 608 and transmit information to the one or more nodes using ADV system platform 600. An on-board computer 204 can communicatively connect to one or more control system nodes 502 over a network 608 such that the relevant information can be transmitted from one or more nodes 502 residing in the network 610 to an on-board computer 204. In this embodiment, users of mobile devices 606 that are connected to the ADV system network 610 via a network 608 can transmit information concerning any of the navigable pathways included in the routes $R_A$, $R_H$ and/or $R_N$.

As described in step 806, after the set of alternative routes $R_A$ has been determined with respect to step 804, each alternative route $R_A$ included in the set of alternative routes $R_A$ is analyzed to determine if any pre-determined restrictions will cause one or more alternative routes $R_A$ to be discarded from the set of available alternative routes $R_A$. For example, once the set of routes $R_A$ have been generated, the on-board computer 204 can take into account any rules or predetermined conditions that must be met to select one of the routes in the set $R_A$ as the new current route $R_{N+1}$. The on-board computer 204 is programmed to select the shortest temporal pathway $R_Q$ from the set of alternative routes $R_A$ that meet one or more predetermined conditions, wherein $R_Q$ represents the route that will take the shortest amount of time for the ADV to traverse from the ADV's current position to the predetermined destination DN (the shortest temporal route) determined from the set of qualifying alternative routes $R_A$. As described in step 806, these predetermined conditions may include conditions that are associated with 1) roadway conditions that exists on one or more navigable pathways included in a relevant $R_A$, 2) tollways or other monetary entities that condition travel on some sort of payment system that that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition or occurrence that exists on one or more navigable pathways included in a relevant $R_A$ that will impede an efficient and/or expedient form of travel. In one embodiment, as described with reference to step 806, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, identified accidents or traffic jams, locations, etc. that may exists and are identifiable geographically within the relevant geographical area that includes one or more navigable pathways included in the set of alternative routes $R_A$. According to step 806, for any alternative routes $R_A$ that do not meet any one or more of the predetermined conditions described herein with reference to step 806, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 808. The time $T_{RQ}$ for each qualifying route $R_Q$ is determined in a manner similar to that of $T_{RN}$ determined for the current route $R_N$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 808, in response to on-board determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{QT}$. In this example, route $R_{QT}$ represents the shortest temporal path of all of the qualifying routes $R_Q$ in the set of qualifying routes $R_Q$ from the current position of the ADV to the predetermined destination $D_N$. As described in step 808, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the predetermined destination $D_N$. The time $T_{Qt}$ for the shortest temporal path $R_{Qt}$ is continuously updated and saved by the on-board computer 204 and/or the one or more control system nodes 502.

As described in step 810, in response to the on-board computer 204 determining the time $T_{Qt}$ for the shortest temporal path $R_{Qt}$, the time $T_{Qt}$ for the shortest temporal path $R_{Qt}$ is compared to the time $T_{RN}$ for the current route $R_N$. If the time $T_{Qt}$ for the current geographical position of the ADV is less than the time $T_{RN}$ for the current route $R_N$, then the on-board computer 204 will set the route $R_{QT}$ as the new route $R_{N+1}$ and automatically reroute the ADV to autonomously navigate the new route $R_{N+1}$ as described herein. Once the new route $R_{N+1}$ is set, the dynamic routing algorithm will cycle back to step 802, set $R_N = R_{N+1}$ and continuously cycle through the dynamic routing algorithm that utilizes artificial intelligence to automatically navigate the ADV as described herein until the ADV reaches its predetermined destination $D_N$. For example, in response to $R_N$ being updated to $R_{N+1}$, the on-board computer 204 will determine the time $T_{RN+1}$ for new route $R_{N+1}$, wherein time $T_{RN+1}$ represents the total time to traverse the route $R_{N+1}$ from the current geographical position of the ADV, as described in step 802. Thereafter, the dynamic routing algorithm will use artificial intelligence as described herein to automatically navigate the ADV by continuously generating alternative routes $R_A$ in real-time, determine if any of those alternative routes represent a shorter temporal route to the current route the ADV is autonomously navigating, and automatically redirect the autonomous vehicle to navigate another alternative route (e.g., new route $R_{N+2}$ if the preceding route was route $R_{N+1}$ and the current destination was DN) if the new route meets predetermined conditions and is a shorter temporal route than the current route the ADV is navigating.

For example, as described in step 812, if the time $T_{Qt}$ for the current geographical position of the ADV is equal to or more than the time $T_{RN}$ for the current route $R_N$, then the on-board computer 204 will discard route $R_{QT}$ go back to step 804 and autonomously navigate the ADV along the current route $R_N$ while continuously cycling through the dynamic routing algorithm to generate alternative routes and determine if an alternative route meets the predetermined conditions and is a shorter temporal route than the current route the ADV is navigating until the ADV reaches its predetermined destination $D_N$, as described herein. In the above embodiments, the on-board computer 204, one or more control system nodes 502 or a combination of both can perform the dynamic routing algorithm that utilizes artificial intelligence to automatically navigate an ADV in real time as described herein.

In one embodiment, either the on-board computer 204 or one or more nodes 502 will generate the set of alternative routes RA. For example, if an ADV is required to navigate road A, road B, road C and road D from its current position to reach a predetermined destination DN, then the ADV on-board computer 204 will monitor its data storage 314 and/or the storage system 506 of one or more control system nodes 502 to determine if there is any current and relevant information concerning road A, road B, road C and/or road D that will impact the navigable time $T_{RN}$. If there exists an event that will impact the navigable time $T_{RN}$ for the current route, either the on-board computer 204 or one or more nodes 502 will generate a new navigable time $T_{RN+1}$ that will take the event into account. Similarly, if an alternative route $R_A$ or a historical route $R_H$ includes road G, road H, road I, and road J which represent navigable pathways that an ADV can navigate to reach the current destination $D_N$ from its current geographical position along one or more alternative routes, the ADV on-board computer 204 will monitor its data storage and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices on the ADV system platform 600 or the data storage system included in one or more control system nodes 502 is current using a time/date stamp (e.g., time of storing, receipt, transmittal, capture, etc.) associated with the information. For example, the on-board computer 204 can determine if a time/date stamp associated with the information is within a predetermined time range X from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qt}$, as described herein using the dynamic routing algorithm described with respect to FIG. 8 herein.

Figure 9:
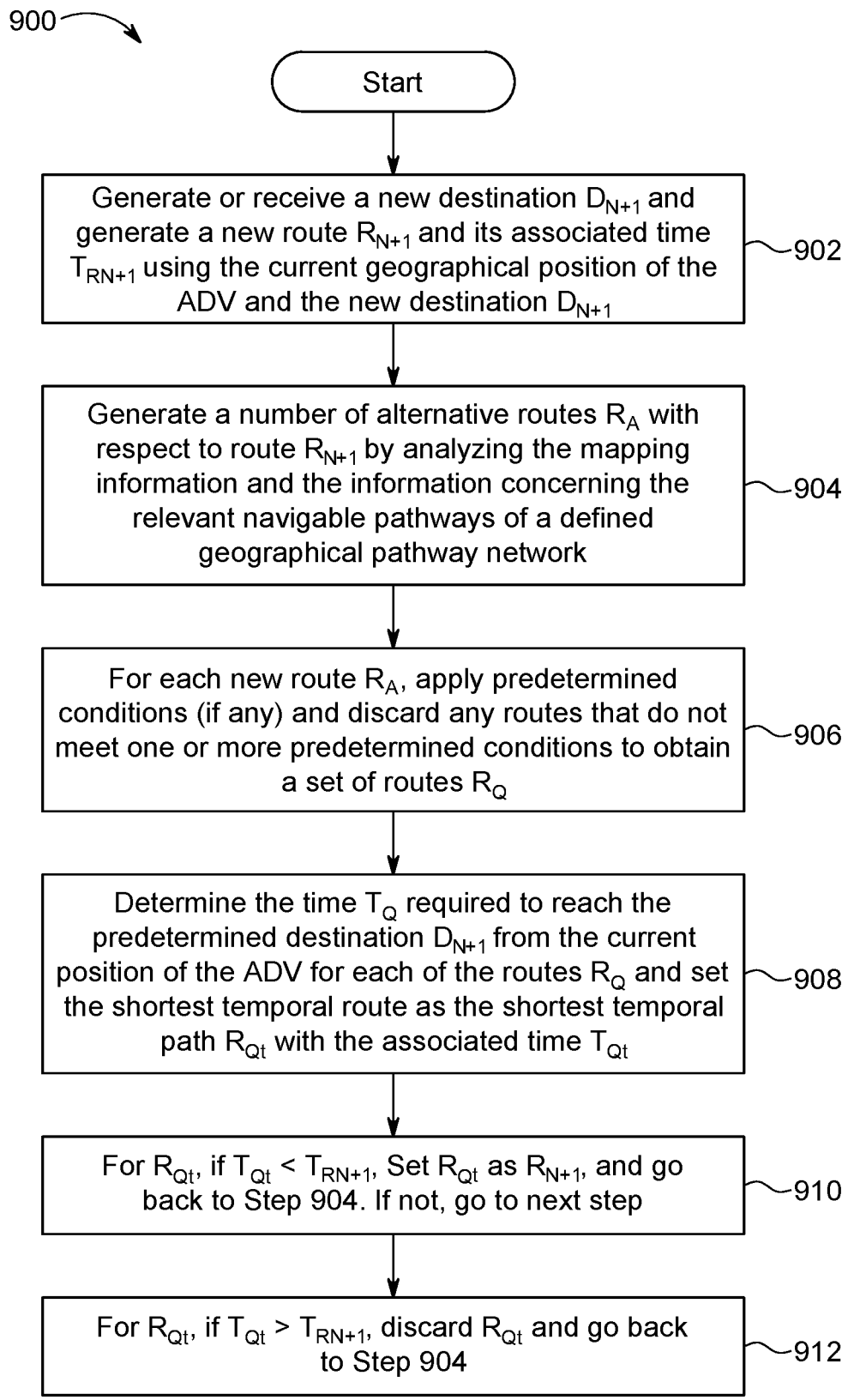
FIG. 9 is an example of a block diagram including a flow charts of one or more steps performed by one or more processors and/or other devices to alter a previous navigation route stored and/or undertaken by an ADV based upon sensor and/or other data received by the processor(s), according to some embodiments.

The on-board computer 204, utilizing the dynamic routing system, mapping system and the positioning system can re-route an ADV from its current geographical position on the current route $R_N$ to a newly determined geographical destination included in the new route $R_{N+1}$ by executing the dynamic re-routing algorithm described with reference to the flowchart illustrated in FIG. 9. Similarly to the routing algorithm described with reference to the flowchart illustrated in FIG. 8, the dynamic algorithm described with reference to FIG. 9 utilizes artificial intelligence to enable an on-board computer 204 to perform dynamic re-routing to, while the ADV is traversing the current route $R_N$, generate a new route $R_{N+1}$ and automatically re-route an ADV from its current geographical position on the current route $R_N$ to a newly determined geographical destination $D_{N+1}$ included in the new route $R_{N+1}$. The on-board computer 204 and/or one or more of the system control nodes 502 are programmed via the dynamic routing system in case of the on-board computer 204 or the routing system in case of the one or more control nodes 502 to execute a dynamic routing algorithm that utilizes artificial intelligence to continuously generate the shortest temporal route from the ADV's current position to a new destination $D_{N+1}$ based upon information concerning the navigable pathways in the relevant geographical region. The dynamic re-routing algorithm will now be described with reference to FIG. 9.

In this embodiment at step 902, while the ADV is autonomously navigating route $R_N$ to reach predetermined geographical destination $D_N$, the on-board computer 204 receives or generates a new destination $D_{N+1}$. Similar to the original destination $D_N$, a new destination $D_{N+1}$ can be generated or received by the on-board computer 204 which will, in turn, cause the on-board computer 204 to generate a new route $R_{N+1}$ from the ADV's current geographical position to the new geographical destination and determine the total time $T_{RN+1}$ that it will take from the ADV's current geographical location to reach the new destination $D_{N+1}$. Depending upon the size of a geographical region to be traversed from the ADV's current position to the new destination $D_{N+1}$ and the amount of relevant available information concerning the navigable pathways within the geographical region that contains the new route $R_{N+1}$, either a single ADV on-board computer 204 can perform dynamic re-routing using artificial intelligence (AI) to generate a new route $R_{N+1}$, or an ADV system network 610 that utilizes one or more ADV control system nodes 502 can be utilized by the on-board ADV computer 204 to perform dynamic routing using artificial intelligence (AI) to generate a new route $R_{N+1}$. For example, similar to the dynamic routing algorithm described above with reference to FIG. 8, if the on-board computer 204 determines that the mapping information stored in the data storage and generated utilizing the mapping system does not contain any one or more parts of the new route $R_{N+1}$, the on-board computer 204 can communicatively couple to one or more control system nodes 502 included in the ADV system network 610 and receive the required mapping information to generate a new route $R_{N+1}$ and perform the dynamic re-routing algorithm. The dynamic re-routing algorithm can be initialized utilizing the dynamic routing system concurrently with the generation or the receipt of a new route $R_{N+1}$ or at any point during the navigation of the route $R_N$ by the ADV when a new destination $D_{N+1}$ is generated or received. As described herein with reference to step 902, the on-board computer 204 determines the current geographical location of the ADV and the total time $T_{RN+1}$ that it will take from the ADV's current geographical location to reach the new destination $D_{N+1}$.

As described with reference to step 904, after the on-board computer 204 generates the new route $R_{N+1}$, on-board computer 204 uses the reference system, the dynamic routing system and the mapping system and analyzes 1) the mapping information generated by the mapping system, 2) data and/or other information transmitted to the on-board computer 204 over a network, and/or 3) historical data stored in the on-board computer 204 data storage and/or the data storage of one or more control system nodes 502 transmitted to the on-board computer 204, if available, to generate a number of alternative navigable routes $R_A$ from the ADV's current position to the new destination $D_{N+1}$. For example, in one embodiment the on-board computer 204 may use the mapping system and the ADV reference system to automatically generate a set number of alternative routes $R_A$ in addition to the new route $R_{N+1}$ when the new route $R_{N+1}$ is initially generated. The routes $R_A$ may be generated based upon a weighted system that utilizes time, distance and/or navigable pathway conditions.

For example, in one embodiment, using the total navigable distance associated with a new route $R_{N+1}$ measured from the ADV's current position on the new route $R_{N+1}$ to the new destination $D_{N+1}$, the on-board computer 204 can also generate a number (e.g., $\leq N$ (which can be any number depending upon the number of routes available and the available system processing resources)) of alternative routes $R_A$ that are within (higher and lower) a navigable distance (e.g., $\leq N \geq$ (which can be a % of the reference navigable distance or some other number)) of the reference navigable distance (defined by the distance from the current location of the ADV to the new geographical destination $D_{N+1}$).

Another embodiment generates a number of alternative routes $R_A$ an ADV can navigate from the ADV's current position to the new destination $D_{N+1}$ as described in step 904 by using a weighting system that uses historical data that includes the average times required to traverse one or more known previously stored routes that align with or most closely align with the new route $R_{N+1}$. In this example, as described herein with reference to step 902, each new route $R_{N+1}$ generated or received by the on-board computer 204 or by one or more control system nodes 502 has a total time value $T_{RN+1}$ associated therewith that is a theoretical measure based upon the total distance of the new route $R_{N+1}$ and/or other information (e.g., current speed of the ADV, known average speed of vehicles one on or more navigable pathways within the route, historical information concerning time(s) to traverse the entire route or one or more navigable pathways included therein, speed limit of one or more navigable pathways within the route, roadway obstructions, accidents, conditions of one or more navigable pathways within the route, time of day, day of the week, or any information that can be used to determine the time to traverse the new route $R_{N+1}$). For example, the time $T_{RN+1}$ for the new route $R_{N+1}$ is continuously updated in the manner described herein and saved as the ADV navigates new route $R_{N+1}$ such that the time $T_{RN+1}$ represents a current temporal measure of the total time it will take the ADV to reach the new destination $D_{N+1}$ from the ADV's current position based upon the information described herein. In one embodiment, as described with respect to step 904, for each new route $R_{N+1}$ received or generated, a series of historical routes $R_H$ are automatically generated based upon certain criteria. For example, historical routes $R_H$ that match or most closely match the new route $R_{N+1}$ are selected by comparing the total time value $T_{RN+1}$ with a total time value $T_{RH}$ (total time to traverse a relevant historical route from the current geographical position of the ADV) that is similarly associated with each $R_H$ and determined in one or more ways consistent with that of $T_{RN+1}$. In one embodiment, the on-board computer 204 and/or one or more control system nodes 502 determines if the $T_{RH}$ is within a predetermined temporal range of $T_{RN+1}$. For example, the temporal range may be any range (higher or lower) (e.g., $\leq T_{RN+1} \geq$ (which can be a % of the reference navigable time $T_{RN+1}$ or some other number)) as long as it is suitable to identify a number of relevant historical routes $R_H$ for the purpose described herein. Each historical route $R_H$ is selected from a repository of historically saved routes either stored in the data storage 314 included in an on-board computer 204 and/or in the storage system 506 of one or more control system nodes 502. As above, if the on-board computer 204 determines that the mapping information stored in the data storage 314 and generated utilizing the mapping system 310 does not contain any one or more navigable pathways included in a historical route $R_H$ or an alternative route $R_A$, the on-board computer 204 can communicatively couple to one or more control system nodes 502 included in the ADV system network 610 and receive the required mapping information to generate a historical route $R_H$ or an alternative route $R_A$ and perform the dynamic routing algorithm. If stored on one or more control system nodes 502, the historical routes $R_H$ may be transmitted to the on-board computer 204 for processing. Once a set of historical routes has been determined using one or more techniques described herein and/or other known techniques, each historical route $R_H$ will be added to the list of alternative routes $R_A$ and associated with a new route $R_{N+1}$. In one embodiment, for each route $R_A$, a total time value $T_{RA}$ that represents the total time to traverse the route $R_A$ from the current geographical position of the ADV that is similarly determined for the new route $R_{N+1}$ in one or more ways described herein is currently updated and saved by the on-board computer 204 and/or the one or more control system nodes 502. In this manner, if $T_{RA}$ for one or more of the alternative routes $R_A$ is determined to be out of the range of acceptable temporal values, those one or more offending routes $R_A$ will be discarded from the set of alternative routes $R_A$.

In one embodiment, the on-board computer 204 can also rely upon information and data transmitted by one or more mobile devices 606 that are connected to the ADV system platform 600 over a network 608 to obtain information that may impact the total time value $T_{RH}$ of one or more historical routes $R_H$, total time value $T_A$ of one or more alternative routes $R_A$ and/or obtain information that may be utilized to calculate and/or update the $T_{RN+1}$ for a new route $R_{N+1}$ upon which an ADV is currently navigating. Information that can be transmitted by one or more mobile devices 606 includes, for example, average speed of vehicles on one or more navigable pathways that are included within one or more of the routes $R_{N+1}$, $R_H$ and/or $R_A$, historical information concerning time(s) to traverse the entirety of one or more of the routes $R_{N+1}$, $R_H$ and/or $R_A$ or one or more navigable pathways included within any one or more of the routes $R_{N+1}$, $R_H$ and/or $R_A$, speed limit of one or more navigable pathways within any one or more of the routes $R_{N+1}$, $R_H$ and/or $R_A$, roadway obstructions, accidents, conditions of one or more navigable pathways within any one or more of the routes $R_{N+1}$, $R_H$ and/or $R_A$, time of day, day of the week, or any information that can be used to determine and/or update the measurements of the times $T_A$, $T_H$ and/or $T_{RN+1}$ to traverse the routes $R_A$, $R_H$ and/or $R_{N+1}$. In this example, that will be described with reference to FIGS. 6A-6B, the mobile devices 606 will connect to one or more control system nodes 502 over a network and transmit information to the one or more nodes 502 using ADV system network 610. An on-board computer 204 can communicatively connect to one or more control system nodes 502 over a network 608 such that the relevant information can be transmitted from one or more nodes 502 residing in the network 610 to an on-board computer 204. In this embodiment, users of mobile devices 606 that are connected to the ADV system platform 600 via a network 608 can transmit information concerning any of the navigable pathways included in the routes $R_A$, $R_H$ and/or $R_{N+1}$.

As described in step 906, after the set of alternative routes $R_A$ has been determined with respect to step 904, each alternative route $R_A$ included in the set of alternative routes $R_A$ is analyzed to determine if any pre-determined restrictions will cause one or more alternative routes $R_A$ to be discarded from the set of available alternative routes $R_A$. For example, once the set of routes $R_A$ have been generated, the on-board computer 204 determines if one of the routes in the set $R_A$ will become a new route $R_{N+2}$ that an ADV will automatically navigate according to a set of rules or predetermined conditions that must be met. For example, as described in step 906, the on-board computer 204 is programmed to select the shortest temporal pathway $R_Q$ from the set of alternative routes $R_A$ that meet one or more predetermined conditions, wherein $R_Q$ represents the route that will take the shortest amount of time for the ADV to traverse from the ADV's current position to the predetermined destination $D_{N+1}$ (the shortest temporal route) determined from the set of qualifying alternative routes $R_A$. As described in step 906, these predetermined conditions may include conditions that are associated with 1) roadway conditions that exists on one or more navigable pathways included in a relevant $R_A$, 2) tollways or other monetary entities that condition travel on some sort of payment system that exists on one or more navigable pathways included in a relevant $R_A$, 3) environmental conditions that exists on one or more navigable pathways included in a relevant $R_A$, 4) accidents or other obstructions that exists on one or more navigable pathways included in a relevant $R_A$, or 5) any other condition(s) or occurrence(s) that exists on one or more navigable pathways included in a relevant $R_A$ that will impede an efficient and/or expedient form of travel. In one embodiment, as described with reference to step 906, the on-board computer 204 is programmed to select alternative routes $R_A$ that avoid certain geographical artifacts that are found along the navigable pathways and/or the relevant geographical region, artifacts including, for example, one or more of city streets, tolls, lights, bridges, highways, street cameras, structures, locations, etc. that may exists and are identifiable geographically within the relevant geographical area that includes one or more navigable pathways included in the set of alternative routes $R_A$. According to step 906, for any alternative routes $R_A$ that do not meet any one or more of the predetermined conditions described herein with reference to step 906, the on-board computer 204 will discard the one or more alternative routes from the set of alternative routes $R_A$ to determine of the set $R_Q$ of qualifying alternative routes $R_Q$.

Once the on-board computer 204 has identified the set of qualifying alternative routes $R_Q$, the on-board computer 204 determines the time $T_{RQ}$ for each qualifying route $R_Q$, wherein $T_{RQ}$ for each route $R_Q$ represents the total time to traverse the route $R_Q$ from the current geographical position of the ADV as described in step 908. The time $T_{RQ}$ for each qualifying route $R_Q$ is determined in a manner similar to that of $T_{RN+1}$ determined for the new route $R_{N+1}$ and/or in one or more ways described herein. Once the set of qualifying routes $R_Q$ is determined, the time $T_{RQ}$ for each qualifying route $R_Q$ is continuously updated and saved by the on-board computer 204 and/or the one or more control system nodes 502. With respect to step 908, in response to the on-board computer 204 determining the time $T_{RQ}$ for each qualifying route $R_Q$, the on-board computer 204 determines the current location of the ADV and, with respect to the current location, determines which time $T_{RQ}$ for each of the qualifying routes $R_Q$ represents the shortest time, and sets the qualifying route that is associated with the shortest $T_{RQ}$ as route $R_{Qt}$. In this example, route $R_{Qt}$ represents the shortest temporal path of all of the qualifying routes $R_Q$ in the set of qualifying routes $R_Q$ from the current position of the ADV to the new destination $D_{N+1}$. As described in step 908, the on-board computer 204 determines the time $T_{Qt}$ for shortest temporal path route $R_{Qt}$, wherein $T_{Qt}$ for the route $R_{Qt}$ represents the total time to traverse the shortest temporal path $R_{Qt}$ from the current geographical position of the ADV to the new destination $D_{N+1}$. The time $T_{Qt}$ for the shortest temporal path $R_{Qt}$ is continuously updated and saved by the on-board computer 204 and/or the one or more control system nodes 502.

As described in step 910, in response to the on-board computer 204 determining the time $T_{Qt}$ for the shortest temporal path $R_{Qt}$, the time $T_{Qt}$ for the shortest temporal path $R_{Qt}$ is compared to the time $T_{RN+1}$ for the new route $R_{N+1}$. If the time $T_{Qt}$ for the current geographical position of the ADV is less than the time $T_{RN+1}$ for the new route $R_{N+1}$, then the on-board computer 204 will set the route $R_{QT}$ as the new route $R_{N+2}$ and automatically re-route the ADV to autonomously navigate the new route $R_{N+2}$ as described herein. Once the new route $R_{N+2}$ is set, the dynamic routing algorithm will recycle back to step 902, set $R_{N+1}$ to $R_{N+2}$ and continuously cycle through the dynamic routing algorithm that utilizes artificial intelligence to automatically navigate the ADV as described herein until the ADV reaches the new destination $D_{N+1}$. For example, in response to $R_{N+1}$ being updated to $R_{N+2}$, the on-board computer 204 will determine the time $T_{RN+2}$ for new route $R_{N+2}$, wherein time $T_{RN+2}$ represents the total time to traverse the route $R_{N+2}$ from the current geographical position of the ADV, as described in step 902. Thereafter, the dynamic routing algorithm will use artificial intelligence as described herein to automatically navigate the ADV by continuously generating alternative routes $R_A$ in real-time to determine if any of those alternative routes represent a shorter temporal route to the current route the ADV is autonomously navigating, and automatically redirect the autonomous vehicle to navigate another alternative route (e.g., new route $R_{N+3}$ if the preceding route was route $R_{N+2}$ and the current destination was $D_{N+2}$) if the new route meets predetermined conditions and is a shorter temporal route than the current route the ADV is navigating.

For example, as described in step 912, if the time $T_{Qt}$ for the current geographical position of the ADV is equal to or more than the time $T_{RN+1}$ for the new route $R_{N+1}$, then the on-board computer 204 will discard route $R_{QT}$, go back to step 904 and autonomously navigate the ADV along the current route $R_{N+1}$ while continuously cycling through the dynamic routing algorithm to generate alternative routes and determine if an alternative route meets the predetermined conditions and is a shorter temporal route than the current route the ADV is navigating until the ADV reaches its new destination $D_{N+1}$, as described herein. In the above embodiments, the on-board computer 204, one or more control system nodes 502 or a combination of both can perform the dynamic re-routing algorithm that utilizes artificial intelligence to automatically navigate an ADV in real time as described herein.

In one embodiment, either the on-board computer 204 or one or more nodes 502 will generate the set of alternative routes $R_A$. For example, if an ADV is required to navigate road A, road B, road C and road D from its current position to reach a new destination $D_{N+1}$, then the ADV on-board computer 204 will monitor its data storage and/or the storage system 506 of one or more control system nodes 502 to determine if there is any current and relevant information concerning road A, road B, road C and/or road D that will impact the navigable time $T_{RN+1}$. If there exists an event that will impact the navigable time $T_{RN+1}$ for the current route, either the on-board computer 204 or one or more nodes 502 will update the navigable time $T_{RN+1}$ that will take the event into account. Similarly, if an alternative route $R_A$ or a historical route $R_H$ includes road G, road H, road I, and road J which represent navigable pathways that an ADV can navigate to reach the new destination $D_{N+1}$ from its current geographical position along one or more alternative routes, the ADV on-board computer 204 will monitor its data storage 314 and/or the storage system 506 of one or more control system nodes 502 to determine if there is any current and relevant information concerning road G, road H, road I, and/or road J that will impact the navigable time $T_{RA}$ or $T_{RH}$ and update the same on the on-board computer 204. In this example, the on-board computer 204 can determine if the information received from devices 606 on the ADV system platform 600 or the data storage system 506 included in one or more control system nodes 502 is current using a time/date stamp (e.g., time of storing, receipt, transmittal, capture, etc.) associated with the information to determine if the received information is within a predetermined time range tx from the current time. For example, the on-board computer 204 can determine if the information is relevant and if the information impacts a time required to traverse one or more roads A-D or an event that affects one or more measured times $T_{RN}$, $T_{RH}$, $T_{RA}$, $T_Q$ and or $T_{Qt}$, as described herein using the dynamic re-routing algorithm described with respect to FIG. 9 herein.

One or more embodiments can use one or more algorithms described herein to automatically change the current route $R_N$ and the current destination $D_N$ and automatically re-route an ADV 602 to a new geographical destination $D_{N+1}$ that includes a border security agency 650 based upon 1) a request for a heightened security screening from the border agency 650, or 2) a heightened security algorithm initiated by an on-board computer 204 in response to ADV occupant identification information, ADV content identification information, and/or information concerning the trip. In either scenario, the data storage 314 included in an ADV on-board computer 204 and/or the storage system 506 included in one or more control system nodes 502 of the ADV network, that is communicatively coupled to the ADV on-board computer 204 over a network 608, stores mapping information of a relevant geographical area that includes the current route of an ADV. For example, in either scenario, the mapping information can be utilized by the on-board computer 204 and/or one or more control system nodes 502 to determine the geographical location of a border security facility and generate a route to the border security facility that represents a new route $R_{N+1}$ and a new destination $D_{N+1}$ that is different than the current route $R_N$ and the current destination $D_N$ utilizing techniques described herein. In one or more embodiments, once a heightened security screening is requested by either the on-board computer or the relevant border agency 650, the new destination (i.e., the geographical location where the security screening will take place) is received or determined by on-board computer 204, the on-board computer will automatically generate routing information, using techniques described herein, and automatically re-route the relevant ADV and its occupants and navigate the new route from the current location of the vehicle to the new destination.

In one or more embodiments, ADV vehicle identification information (described herein), ADV occupant identification information (described herein), and ADV content information (described herein) is wirelessly transmitted to a relevant border security agency. As described herein, the CPU 302 is programmed via occupant identification system 320 to utilize occupant sensors 208 and generate information that can be utilized to verify the identification of the ADV occupants. Occupant identification information can be obtained from input data by the one or more ADV occupants utilizing a GUI (not shown), and/or data obtained by the utilization of occupant sensors 208 (e.g., camera and sensor devices, scanners, readers, etc.). The ADV occupant identification information can include scanned governmental IDs and forms (e.g., driver's license, passport, social security card, credit cards, immigration documents, travel forms, on-line forms, etc.), photographs and other imaging data received by occupant sensors 208 or any other information that may be used to verify a person's identification. The information concerning the contents that are being transported within the relevant ADV can be obtained from user input using a GUI (not shown) that enters the identification of items that will reside in the ADV interior either in a container (e.g., suitcase, backpack, bag, container, etc.), outside a container (e.g., golf clubs, sporting equipment, rifles, etc.), or on an ADV occupant's person (e.g., weapon, glasses, wallet, etc.). As described herein, the CPU 302 is programmed via content identification and monitoring system 322 to utilize content sensors 220 and generate information that can be utilized to identify and/or verify the ADV contents that will be transported within the ADV vehicle. Once the occupant identification and the ADV content information is obtained, the same is stored in data storage 314 and/or storage system 506 in one or more nodes 502 such that it can be transmitted via network 608 to the relevant border agency 650.

The occupant identification, ADV content information, ADV identification information, trip information (e.g., details concerning the trip, described herein) and any other relevant information (i.e., border security information) can be transmitted in response to certain occurrences. For example, once it is determined by either an on-board computer or one or more nodes 502 in the ADV network 610 that a current route of an ADV includes one or more navigable pathways that cross a secured border, the border security information can be automatically obtained using techniques described herein and automatically transmitted to the relevant border security agency such that the information can be utilized in any manner they deem appropriate to either let the ADV navigate the border crossing route uninterrupted or transmit a request for a heightened screening, an action that would automatically re-route the ADV to another predetermined destination $D_{N+1}$, as described herein. Similarly, the border security information can be transmitted to the relevant border security agency automatically at a certain point along the border crossing route (e.g., within a certain distance from the border or border security agency, or a specific border security facility). Similarly, the border security information can be manually transmitted by an ADV occupant.

In one or more embodiments as described with reference to FIGS. 10A (e.g., step 1002) and 10B, one or more detected physiological states (i.e., physiological state information) of one or more ADV occupants can also be transmitted to a relevant border security agency in real-time, upon certain occurrences as described herein with respect to border security information, and/or upon the detection of an event, to a relevant border security agency 650 as described herein. For example, an on-board computer 204 via an occupant physiological state monitoring system 312 can monitor one or more occupants of the ADV using occupant sensors 208. As described herein, occupant sensors 208 can be wired sensors, wireless sensors, wearable sensors (e.g., one or more ADV wearable physiological sensor 270 and/or ADV wearable occupant sensor device 250 operated as described herein) and/or any combination of the aforementioned. As described with reference to step 1002A described with reference to FIG. 10B, one or more of the occupant sensors 208 described herein are calibrated using baseline measurements for each occupant being monitored such that accurate and precise physiological parameter measurements can be obtained by the on-board computer 204 via the occupant physiological state monitoring system 312. This step can be performed at the initialization stage of the physiological monitoring algorithm and also performed one or more times during the occupancy of the ADV with respect to the relevant occupants. The calibration step is also performed when a new occupant to be monitored using the physiological monitoring algorithm enters the ADV.

Once the occupant sensors 208 are calibrated, the on-board computer 204 initiates a monitoring mode at step 1002B wherein occupant sensors 208 generate data that is indicative of one or more of a relevant occupant's physiological and/or current state of being. In one embodiment, the occupant sensors 208 continuously monitor and generate data that is indicative of the current physiological state of the relevant occupants for the entirety of the travel time. In another embodiment, the occupant sensors 208 enter a monitoring mode at intermittent times during a trip and lie in a resting/dormant state for other times during a trip. The monitoring and resting times for the occupant sensors 208 concerning a monitoring mode may be dependent upon the times that a relevant border security agency wants to determine the current physiological state of the relevant ADV occupants (e.g., any time during the trip, 10 miles before the secure border, at any time during the heightened security screening, etc.). In one embodiment, the data processed by the occupant sensors can be indicative of a patient's vital signs, physiological signs including, for example, electrocardiogram (ECG), electromyogram (EMG), heart rate (HR), body temperature, electrodermal activity (EDA), arterial oxygen saturation (SpO2), blood pressure (BP) and respiration rate (RR) as described herein and with reference to step 1002B. For example, one or more of the occupant sensors 208 may be micro-electro-mechanical system (MEMS) sensors that include, for example, magnetic field sensors, gyroscopes, and accelerometers that measure motion and be used to generate data concerning cardiovascular and pulmonary physiological conditions and sleep analysis. One or more of the occupant sensors 208 can be a strain gauge that is worn by an occupant that generates data that is indicative of an occupant's respiratory cycle. For example, one or more wearable physiological sensors 270 worn by one or more ADV occupants can include one or more strain gauges that generate data while a relevant occupant breathes due to his/her chest expanding and contracting. One or more of the occupant sensors 208 may be a camera that measures facial expressions, movement, physical activity, etc., images of which can be indicative of one or more physiological states (e.g., anxiety, nervousness, stress, destress, heightened awareness, panic attack, epilepsy, heart attack, stroke, seizure, neurological conditions or episodes, illness due to temperature, etc.). For example, one or more of the occupant sensors 208, such as one or more ADV wearable physiological sensors 270, can include one or more electrodes that are embedded in a piece of wearable clothing, such as a t-shirt, a headband, a sock, undergarments or any other piece of clothing that is in physical contact with an ADV occupant's skin to measure ECG, heart rate, and respiration rate. For example, one or more of the wearable physiological sensors 270 can be a plurality of electrodes encased in fabric and configured to generate ECG data from an ADV occupant when disposed in close proximity to an occupant's skin.

Once the occupant sensors 208 start generating physiological data as described herein, the on-board computer 204, as described with reference to step 1002C, processes the physiological data received from one or more occupant sensors 208 utilizing the occupant physiological monitoring system 312 and measures vital signs and physiological signs such as electrocardiogram (ECG), electromyogram (EMG), heart rate (HR), body temperature, electrodermal activity (EDA), arterial oxygen saturation ($SpO_2$), blood pressure (BP) and respiration rate (RR) and/or other information that is indicative of an one or more occupant's physiological and/or current state of being. Due to the calibration process of the occupant sensors 208 performed within the physiological monitoring algorithm, the determination of whether an event occurs for one or more of the relevant ADV occupants is an individualized determination for each monitored occupant. The on-board computer 204 is configured to monitor and process physiological data and information for a plurality of ADV occupants simultaneously. For example, if one more occupant sensors 208 is a wireless sensor that functions as discussed herein (e.g., camera), the on-board computer 204 will differentiate between the ADV occupants and based upon the calibration data received and generated, data which can include baseline physiological data that is individual to an occupant (e.g., facial recognition, certain physiological signs and measurements, a person's identity, age, sex, race, finger prints, gender, etc.). In one embodiment, ADV wearable occupant sensor device 250 is configured to transmit processed sensor data to an on-board computer 240 such that the on-board computer 204 can process the information to determine if an event has been detected.

As described herein and with reference to step 1002C, an event may include one or more physiological states of the relevant ADV occupant including, for example, anxiety, nervousness, stress, destress, heightened awareness, panic attack, epilepsy, heart attack, stroke, seizure, one or more neurological conditions or episodes, illness due to temperature, one or more respiratory ailments and/or conditions, heart ailments and/or conditions, and/or one or more conditions and/or ailments that affect an occupant's physiological, emotional or physical state. In one embodiment, an on-board computer 204 is continuously processing physiological sensor data to determine if one or more physiological metrics (e.g., electrocardiogram (ECG), electromyogram (EMG), heart rate (HR), body temperature, electrodermal activity (EDA), arterial oxygen saturation ($SpO_2$), blood pressure (BP) and respiration rate (RR) and/or other physiological metrics or indicators of a person's current physiological state) falls outside a normal range or above/below a predetermined threshold for one or more ADV occupants. In one embodiment, the on-board computer 204 utilizing the occupant physiological and monitoring system is programmed to be a multi-parameter event system such that two or more physiological variables and/or physiological metrics variables that fall outside a predetermined range for the relevant metric will trigger an event.

For example, with respect to step 1002D, the on-board computer 204 is monitoring the current state of one or more relevant ADV occupants such that, as described in step 1002C, the on-board computer 204 will keep monitoring the occupant sensor 208 data until an event occurs. If no event occurs, as described with reference to the query block 1002D in FIG. 10B, the flow chart moves back to step 1002C, the flow chart describing the continuous monitoring function of the on-board computer 204. If an on-board computer 204 determines that one or more physiological metrics falls outside of a normal range or is above/below a predetermined threshold for one or more ADV occupants and determines, based upon this and/or other physiological information either received or processed by the on-board computer 204, that an event has been detected, the algorithm moves to step 1004 described with reference to FIG. 10A, and the on-board computer 204 automatically associates the ADV occupant physiological data with the border security information relevant to the monitored ADV occupant, transmits the physiological data to one or more nodes 502, and/or transmits the physiological data directly to the relevant border agency 650.

Figure 10A:
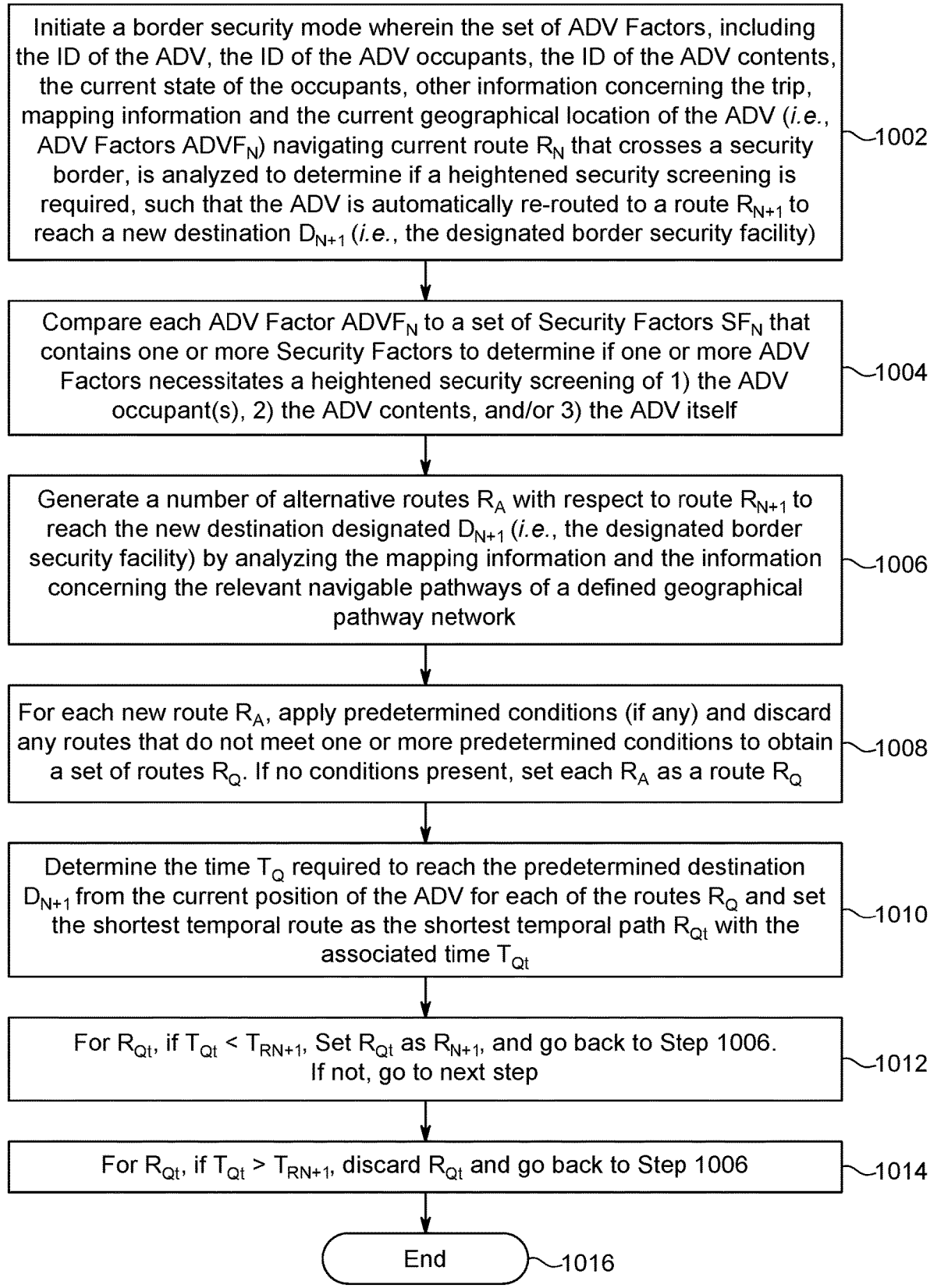
FIG. 10A is an example of a block diagram including a flow charts of one or more steps performed by one or more processors and/or other devices to alter a previous navigation route stored and/or undertaken by an ADV based upon sensor and/or other data received by the processor(s), according to some embodiments.
Figure 10B:
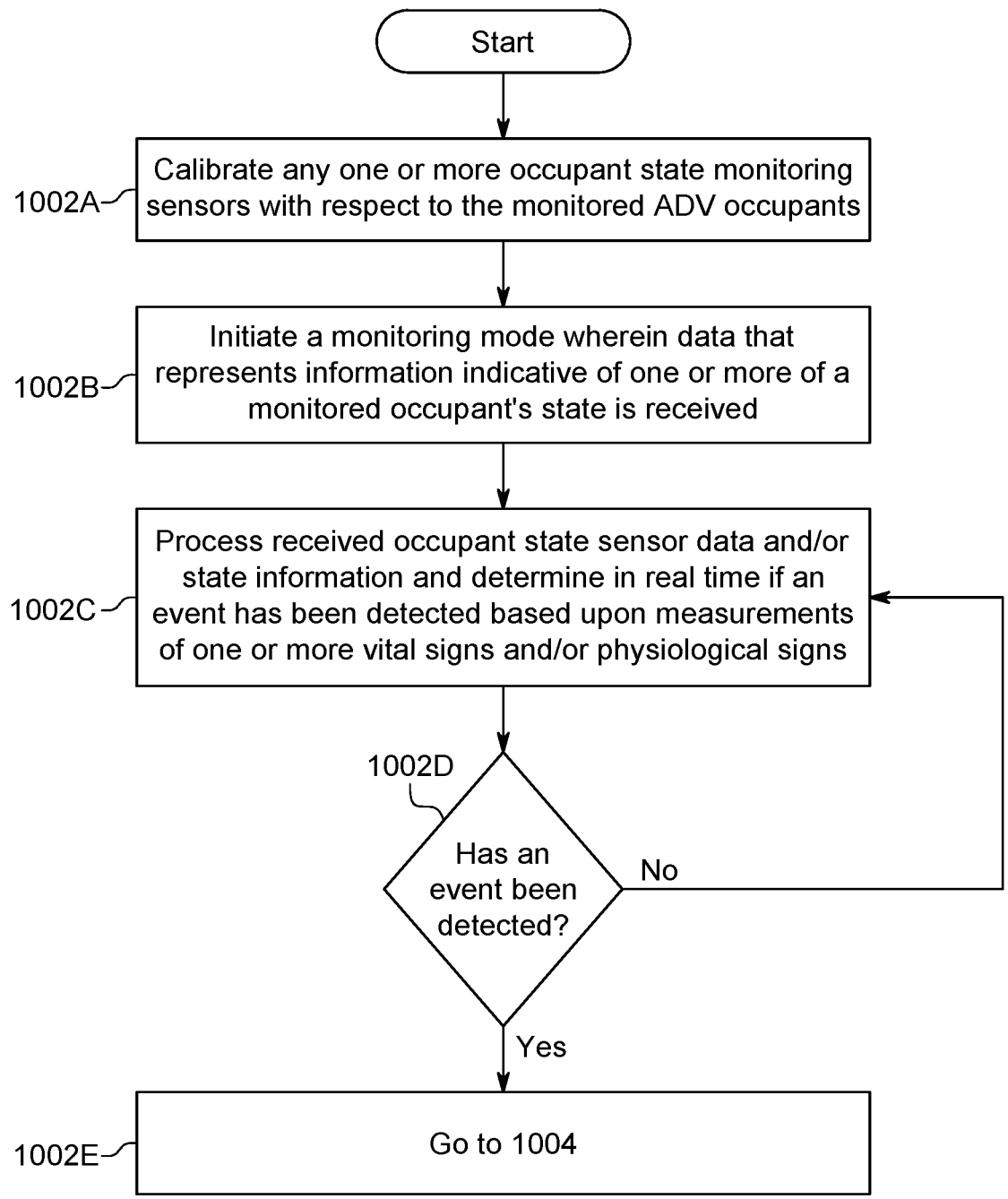
FIG. 10B is an example of a block diagram including a flow charts of one or more steps performed by one or more processors and/or other devices to alter a previous navigation route stored and/or undertaken by an ADV based upon sensor and/or other data received by the processor(s), according to some embodiments.

In one or more embodiments, an on-board computer, utilizing the border security dynamic re-routing algorithm described with respect to FIG. 10A that utilizes artificial intelligence, analyzes received and obtained border security information to determine whether a relevant border security agency should perform a heightened security screening of one or more of the ADV occupants, the ADV contents, and the ADV vehicle itself and, upon finding that a heightened security screening should be performed, automatically re-routes the ADV to a border security facility. For example, with respect to step 1002, a border security mode is initiated wherein the border security information (as described herein, including but not limited to ADV identification information, ADV content information, ADV occupant identification information, information concerning the trip (e.g., routing information, person's that will be visited, reasons for the trip, and any other relevant information concerning the trip) and any other relevant information) is received and/or obtained using techniques described herein. The border security information can include the current physiological state of one or more of the ADV occupants obtained with respect to the flowchart described in FIG. 10B. The border security information is organized, as described with respect to step 1004, such that it is associated with a particular ADV vehicle and referenced herein, for simplicity sake, as a set of ADV factors that includes all of the border security information. In one or more embodiments, the border security information can be stored and referenced in any manner such as in one or more databases or memory structures described herein. For example, database structures and the contents that populate the same can be utilized. At step 1004, the set $ADVF_N$ of ADV factors is compared against a set of security factors $SF_N$ that contain one or more security factors $SF_{NP}$ (primary) and $SF_{NS}$ to determine if one or more ADV factors necessitates a heightened security screening.

In one or more embodiments, one or more processors including processor 302 and/or one or more processors including processor 514 can be programmed to communicatively couple with one or more security and/or immigration databases to compare ADV occupant identification data and ADV content data received by one or more occupant sensor devices 208 and contents sensors 220 to database information to assist in determining if a heightened security screening should be requested. For example, processor 302 and/or one or more processors 514 included in one or more nodes 502 can transmit a request to border security agency 650, along with the identification data received by the occupant sensor devices 208 that is indicative of the identification of the one or more ADV occupants, to confirm the identification of the ADV occupants and/or determine if the identification of one or more ADV occupants warrants heightened screening. In one or more embodiments, the on-board computer 204 or one or more nodes 502 have access to a security agency database, held in data storage 656, one or more computer devices 652 or server 654, to compare the received ADV occupant identification from occupant sensor devices 208 with security agency stored data such that the on-board computer or one or more nodes will confirm the identification of the ADV occupants. In another embodiment, the relevant security agency 650 will receive the wirelessly transmitted ADV occupant data and, in response to a request for confirmation of the identification of the ADV occupants, transmit the confirmation via network 608 to the on-board computer 204 and/or one or more control and system nodes 502. In one or more embodiments, the relevant security receives the data that is indicative of the identification of the one or more ADV occupants and the data that is indicative of the identification of one or more ADV contents that are being transported by the ADV and wirelessly transmits a determination and/or information to on-board computer 204 and/or one or more control and system nodes 502 such that a determination can be made by on-board computer 204 and/or one or more control and system nodes 502 whether a heightened security screening should be requested. In one or more embodiments, the relevant security agency itself can transmit a request for a heightened security screening.

In one or more embodiments, on-board computer 204 and/or one or more control and system nodes 502 can be given access to one or more relevant national or regional databases to wirelessly requests, via one or networks, data that may be utilized to identify and/or confirm the identity of one or more ADV occupants. For example, national and/or regional databases that may be accessed include the one or more department of motor vehicle (DMV) databases, one or more relevant Transportation Security Administration (TSA) databases, Federal Bureau of Investigation databases, one or more credit card databases, one or more voter verification databases, one or more national car insurance or other insurance databases, one or more National Identification databases, one or more public databases including utility databases, and/or social security databases, etc. Utilizing these types of databases, one or more embodiments can identify and/or confirm the identities of ADV occupants in any country that has databases that can be accessed to verify the identification of persons. In one or more embodiments, the same or similar databases can be accessed by on-board computer 204 and/or one or more control and system nodes 502 to determine what ADV contents identified by contents sensor devices 220 are legal, illegal and/or require heightened scrutiny for each country, geographical region and or secure location.

Figure 10C:
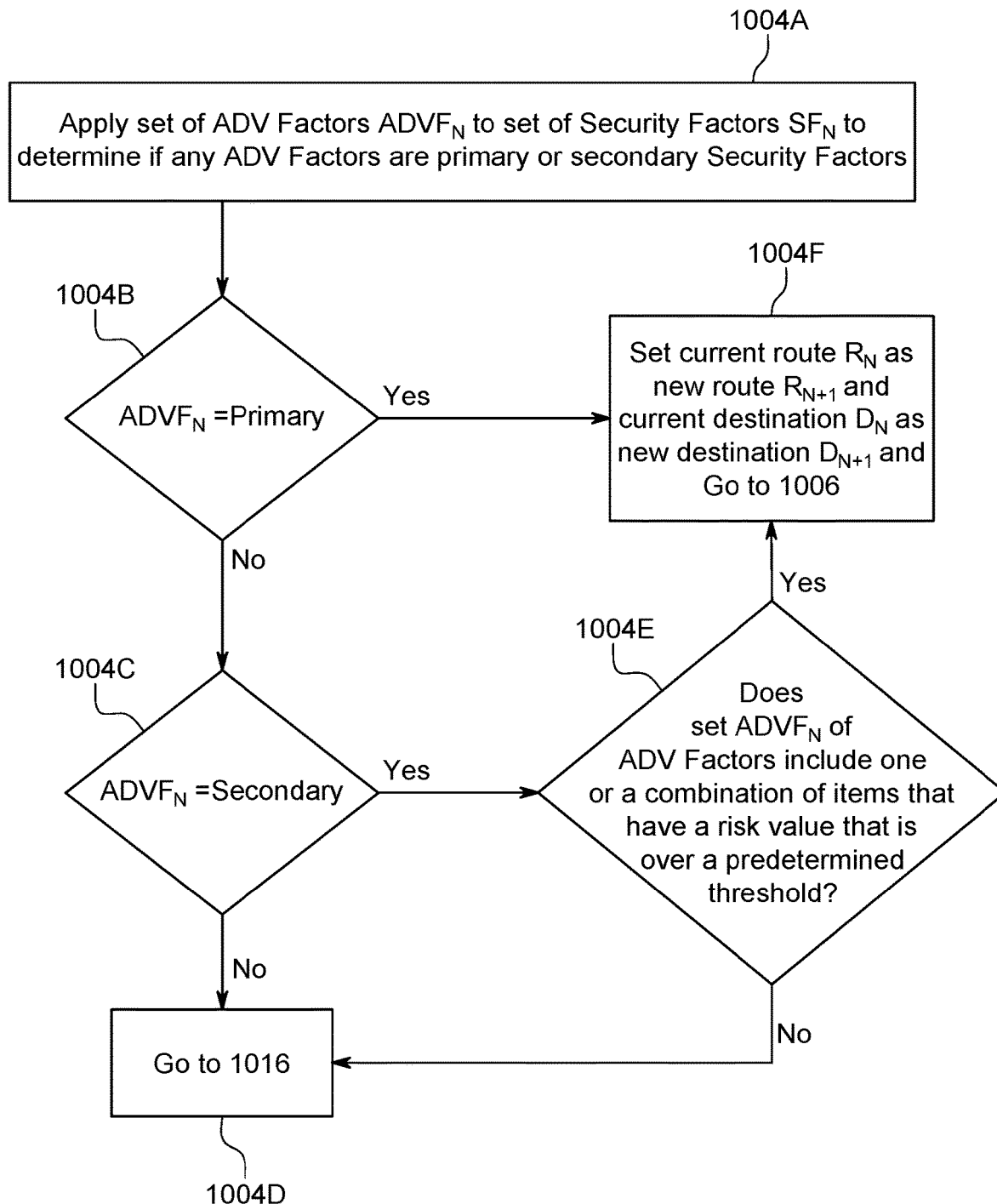
FIG. 10C is an example of a block diagram including a flow charts of one or more steps performed by one or more processors and/or other devices to alter a previous navigation route stored and/or undertaken by an ADV based upon sensor and/or other data received by the processor(s), according to some embodiments.

As described with respect to FIG. 10C step 1004A, the set of security factors $SF_N$ that contain one or more security factors can be organized in a list of primary security factors and weighted secondary security factors. In this example, if the set $ADVF_N$ of ADV factors as compared to the set of security factors satisfies any primary security factors $SF_{NP}$, a heightened security screening is automatically initiated as described with reference to FIG. 10A at step 1006 such that the dynamic routing algorithm is commenced, as described herein and with respect to steps 1006 to 1010. Primary security factors $SF_{NP}$ related to ADV identification information include but are not limited to the following: The identification of a known felon; The identification of a missing person; The identification of a person (e.g., a minor) that is the subject of a court order; The identification of an illegal immigrant; The identification of a person of interest; and The identification of any individual that warrants heightened scrutiny or has been banned by TSA or any other governmental agency. Secondary factors that $SF_{NS}$ related to ADV identification information include but are not limited to the following: The identification of a person that has gone through the heightened security screening process before; The identification of a predetermined number of minors in a single ADV; The identification of one or more persons that fit some sort of profile; The identification of a person that will be visiting a foreign country for an unusually short or unusually long amount of time; and/or Any other issue that may be associated with an individual that can be taken into account in determining whether a heightened security screening should be imposed.

Primary security factors $SF_{NP}$ related to ADV content information include but are not limited to the following: A gun; A knife that is extremely long, hazardous or used for only one purpose (e.g., sword, scabbard, spear, etc.); An explosive; A hazardous chemical; An unusually large amount of chemical(s); A collection of separate items when combined form any of the primary items or similar items described herein; Animals that are harmful to the ecosystem or banned from a particular country; Plants that are harmful to the ecosystem or banned from a particular country; and Any items banned by TSA or any other governmental agency. Secondary factors that $SF_{NS}$ related to ADV content information include but are not limited to the following: An unusual chemical(s); A knife that is legal but suspicious in any way; Items of interest (e.g., to an investigation, items that pose questions as to why the individual has it in his/her possession; items that seem extremely valuable); Extremely large amounts of currency; Extremely rare animals and/or plants; Unidentified rare animals and/or plants; or any item that is worth further scrutiny.

Additionally, details about the trip including person's to be visited, lodging and lack of lodging accommodations, length of time versus the amount of clothing taken on the trip, or any other detail about the trip itself can be utilized to factor into whether a heightened security screening should be imposed. Additionally, any detail about the ADV vehicle itself can be utilized to factor into whether a heightened security screening should be imposed. For example, if the ADV vehicle was tampered with such that sensors detect a change in tire pressure, weight, alignment, core computer operations, etc. can be factored into a determination as to whether a heightened security screening should be imposed.

As described with respect to step 1004B in FIG. 10C, if any ADV factors in the set $ADVF_N$ match any primary security factors $SF_{NP}$, the algorithm advances to step 1004F wherein the ADV is automatically re-routed from its current geographical destination $D_N$ along the current route $R_N$ to navigate a new route $R_{N+1}$ to reach the new predetermined destination $D_{N+1}$ (i.e., wherein the new destination $D_{N+1}$ is the geographical location of the border security agency facility where the heightened security screening will take place) and advances to step 1006 as described in FIG. 10A. The new route $R_{N+1}$ can be generated, for example, by determining the path with the shortest distance from the current geographical vehicle position to the new destination $D_{N+1}$ utilizing mapping information generated by on-board computer 204 that include the lengths of the navigable pathways between the current vehicle location and the new destination. In one or more embodiments, at steps 1006 through 1014, the dynamic routing algorithm utilizing AI (artificial intelligence), as described with respect to FIG. 9, will initialize such that alternative qualifying routes $R_Q$ and their associated times $T_Q$ required to reach the border agency screening facility (i.e., new destination D N+1) utilizing each of the alternative qualifying routes $R_Q$ are generated and compared against the current route $R_{N+1}$ and the associated time $T_{RN+1}$ that it will take to reach the border agency screening facility from the current geographical position of the ADV using the current route $R_{N+1}$. In this embodiment, steps 1006, 1008, 1010, 1012, and 1014 that utilize a dynamic re-routing algorithm that utilizes AI to determine the shortest temporal route to a destination will not be discussed in detail as they are similar to steps 904, 906, 908, 910 and 912, respectively, which are fully discussed herein with respect to FIGS. 7-9 along with the techniques for performing the associated functionality.

As described with respect to step 1004B in FIG. 10C, if none of the ADV factors in the set $ADVF_N$ match any primary security factors $SF_{NP}$, the algorithm advances to step 1004C to determine if any of the ADV factors match any of the secondary security factors $SF_{NS}$. One or more embodiments assign certain numerical weights to each secondary security factor that represents a risk value for that particular secondary factor. For example, at step 1004E, if an ADV occupant is transporting a can of gasoline in the ADV, the identification of a can of gasoline matches a secondary security factor at step 1004C and the algorithm advances to step 1004E to determine the risk level associated with the can of gasoline. For example, at step 1004E, it may be determined that the possession of a can of gasoline by itself may have an associated risk factor of 2. In this instance, because the combined risk factors of all of the ADV factors that match any secondary security factors $SF_{NS}$ do not add up to a predetermined threshold, e.g., 10, the on-board computer 204 has determined that the risk factor is low enough such that a heightened security screening is not required. In this example, the algorithm advances to step 1004D wherein the algorithm is advanced to step 10016 described with respect to FIG. 10A which ends the ADV initiated border security screening mode such that the ADV is not re-routed to a border security facility and can continue on its present route across the relevant secure border without stopping.

In another example, at step 1004E, if the on-board computer 204 identifies both a can of gasoline and a bag of fertilizer such that, when combined, the risk factors exceed a predetermined threshold, e.g., 10, then the algorithm advances to step 1004F wherein the ADV is automatically re-routed by on-board computer 204 from its current geographical destination $D_N$ along the current route $R_N$ to navigate a new route $R_{N+1}$ to reach the new predetermined destination $D_{N+1}$ (i.e., wherein the new destination $D_{N+1}$ is the geographical location of the border security agency facility where the heightened security screening will take place) and advances to step 1006 as described in FIG. 10A. In one or more embodiments, at steps 1006 through 1014, the dynamic routing algorithm utilizing AI (artificial intelligence), as described with respect to FIG. 9, will initialize such that alternative qualifying routes $R_Q$ and their associated times $T_Q$ required to reach the border agency screening facility (i.e., new destination DN+1) utilizing each of the alternative qualifying routes $R_Q$ are generated and compared against the current route $R_{N+1}$ and the associated time $T_{RN+1}$ that it will take to reach the border agency screening facility from the current geographical position of the ADV using the current route $R_{N+1}$. In this embodiment, steps 1006, 1008, 1010, 1012, and 1014 that utilize a dynamic re-routing algorithm that utilizes AI to determine the shortest temporal route to a destination are similar to steps 904, 906, 908, 910 and 912, respectively, and will not be discussed in detail.

In one or more embodiments, current physiological states of one or more ADV occupants can be categorized as primary or secondary security factors that will either automatically re-route the ADV to a border security facility to engage in a heightened screening process, as described with step 1004F in FIG. 10C, or can be treated as secondary security factors that can be associated with numerical weights that represent a risk value, as described with respect to step 1004E described with reference to FIG. 10C. For example, if an on-board computer 204 detects via occupant state monitoring system 312 utilizing one or more occupant sensors 208 that one or more ADV occupants is currently having an anxiety attack within a certain distance from a security check-point (e.g., an ADV factor that matches a secondary security factor that has a risk value of 2 by itself), this information alone is not enough to re-route the ADV to a border security facility, as described at step 1004F in FIG. 10C. For example, if the ADV transporting the person having the anxiety attack is also transporting valuable contents such as jewelry and a somewhat large amount of currency (i.e., two ADV factors that match secondary factors that by themselves do not combine to meet a predetermined threshold of risk) and when the numerical risk associated with these three secondary security factors together is calculated, it can, for example, exceed a predetermined numerical risk threshold. In this example, the ADV is automatically re-routed by on-board computer 204 from its current geographical destination $D_N$ along the current route $R_N$ to navigate a new route $R_{N+1}$ to reach the new predetermined destination $D_{N+1}$ (i.e., wherein the new destination $D_{N+1}$ is the geographical location of the border security agency facility where the heightened security screening will take place) and advances to step 1006 as described in FIG. 10A. In each of these examples as described with one or more embodiments, upon the detection of one or more ADV factors matching at least one primary security factor $SF_P$ or the requisite secondary security factors $SF_S$ such that a predetermined numerical risk threshold is exceeded, as described herein with reference to FIG. 10C, the on-board computer 204 and/or one or more of the system control nodes 502 are programmed via the dynamic routing system 308 in case of the on-board computer 204 or the routing system 512 in case of the one or more control nodes to execute a dynamic routing algorithm that utilizes artificial intelligence to continuously generate the shortest temporal route from the ADV's current position to the new destination $D_{N+1}$ (i.e., wherein the new destination $D_{N+1}$ is the geographical location of the border security agency facility where the heightened security screening will take place) based upon information concerning the navigable pathways in the relevant geographical region.

In one or more embodiments, as described herein and with reference to FIGS. 6B, and 10A through 10C, one or more processors 302 (on-board computer) and/or 514 (control system nodes) and/or other hardware are utilized to execute a dynamic routing algorithm that utilizes artificial intelligence to dynamically alter a planned or current route of an ADV and re-route the ADV to a border security agency 650 facility based upon a heightened security screening request. The screening request can be based on one or more real-time events associated with one or more occupants of an ADV or arbitrarily requested. For example, a border security dynamic re-routing algorithm can be automatically initialized by an on-board computer 204 in response to a request for a heightened screening from a border security agency before a trip is started or at any point during a trip that the relevant ADV is autonomously navigating a current route $R_N$ (e.g., before the ADV reaches the secure border, after the ADV crosses the secure border, or before the ADV starts navigating the current route $R_N$). In this embodiment, the border security agency can also require that the relevant ADV include one or more predetermined navigable pathways in any new routes generated to reach the new border security destination. Once the new border security destination and any routing requirements are received or determined by an on-board computer 204, the on-board computer 204 utilizes the dynamic routing system 308, mapping system 310 and the reference positioning system 304 to automatically re-route the ADV from its current geographical position on the current route $R_N$ to a new route $R_{N+1}$ that includes the new geographical destination $D_{N+1}$ associated with a qualifying border security agency 650. In this embodiment, the on-board computer 204 and/or one or more of the system control nodes 502 are programmed via the dynamic routing system 308 in case of the on-board computer 204 and the routing system 512 in case of the one or more control nodes to execute a dynamic routing algorithm that utilizes artificial intelligence to continuously generate 1) a set of routes $R_Q$ from the ADV's current position to new geographical destination (i.e., border security facility), and 2) the shortest temporal route $R_{Q_t}$ from the set of routes $R_Q$ that are continuously generated from the ADV's current position to the border security facility based upon information concerning the navigable pathways in the relevant geographical region and within the set of continuously generated routes $R_Q$.

Another embodiment can use one or more dynamic routing algorithms utilizing artificial intelligence described herein to automatically change the current destination of an ADV to a new geographical destination based upon one or more environmental conditions that exists or will exists to impact one or more navigational pathways in the relevant geographical area. Still another embodiment can use one or more algorithms described herein to navigate an ADV to a plurality of predetermined geographical destinations in a single generated route, wherein the ADV can dynamically choose any one of the plurality of predetermined destinations $D_N$ that represents the shortest temporal pathway from the current geographical location of the ADV, then move on to choose any one of the remaining plurality of predetermined destinations $D_{N-1}$ (i.e., a set of destinations that does not include the previously chosen destination) based upon which of the set of destinations $D_{N-2}$ represents the shortest temporal pathway from the current geographical location of the ADV, and so on until all of the plurality of predetermined destinations $D_N$ have been reached by the ADV.

FIG. 6B shows a system block diagram of one embodiment the ADV system network platform 600 that operates as a border security screening system in conjunction with an identified border security agency 650 (e.g., international border security agency, security agency for a secure zone in a geographical area, etc.) that may be communicatively coupled to the ADV system network platform 600. In one or more embodiments, the ADV system cloud network 610 that comprises one or more control nodes 502 that are described with reference to FIGS. 5 and 6B can include one or more web servers, and one or more waveform servers. The waveform servers and web servers are communicatively connected to the Internet such that data transmitted to the waveform servers and web servers from one or more ADVs including border security information concerning one or more occupants of an ADV, ADV contents that are being transported by the ADV and information concerning the trip and the ADV itself, as described herein, can be transmitted by one or more of the waveform servers and web servers over a local network 608 to a border security agency 650 or other security or governmental agency. For example, once an ADV is automatically re-routed to a border security agency as described herein, information concerning an arrival time of an ADV defined as the time it will the ADV to reach the relevant border security agency from the current geographical position of the ADV (i.e., the current destination of the ADV along a route once it has been re-routed in accordance with the border security dynamic re-routing algorithm described herein) can be transmitted to the relevant border security agency along with other information, data and instructions. For example, once the relevant ADV carrying one or more occupants and items is re-routed to an identified border security agency, information including one or more of an occupant's current physiological state, metrics, age, gender, height, weight, race and/or any other information concerning the one or more relevant occupants can be transmitted to the border security agency while the ADV is autonomously navigating the current route to the border security agency.

In one embodiment, the web servers included in one or more control system nodes 502 are communicatively coupled to a border security agency via communications bus 660 such that the border agency 650 can transmit the border security information described herein concerning the ADV and its occupants to a database 656 that can be accessed by border security agency computer stations 652. Information that is transmitted from the waveform servers and web servers containing border security information can be transmitted to a facility data storage facility 656 (e.g., database) such that it can become accessible to any border security agency facility that has access to the data storage facility 656. For example, the transmitted information can become part of an occupant's immigration or travel record such that the information will be associated with any currently existing or newly created record(s) for the ADV occupant and stored in the relevant border security agency database for accessibility by those security agents or other embassy personnel with proper authorization. For example, in an embodiment of FIG. 6B, a plurality of border, immigration and embassy facilities include a plurality of computer user interfaces that are configured to receive data from an applet that resides within a border security agency server 654 and communicates with either of a waveform server that is one or more of the nodes 502 in the ADV system network over a public network such as a TCP/IP network to update an ADV occupant's record for processing one or more relevant ADV occupants through immigration. In one embodiment, the system 600 can include one or more physiological sensor transmitters that are included in wearable sensors 208 described above for transmitting physiological data to an ADV on-board computer 204 that, in turn, will transmit the processed data and other physiological information to one or more control system nodes 502, as described herein.

As described herein, ADV 602 includes an on-board computer 204 that functions to autonomously navigate "drive" the ADV along generated routes. Additionally, ADV 602 can be controlled manually when put into a manual mode of operation to operate as a normal vehicle. Here, an ADV occupant can manually operate a steering wheel, gas and brake pedals, turn signals, emergency lights, utilize one or more mirrors, and accelerate and/or come to a complete stop such that the ADV can be driven like a conventional vehicle.

The flowchart and block diagrams in the Figures referenced to describe one or more embodiments illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s) and/or method steps. It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more embodiments of examples of the computer devices that can be utilized in within the ADV system network platform 600, as described with reference to FIGS. 6A and 6B, and/or computers communicatively connected to the network platform 600 will now be described with reference to FIGS. 1-6B. For example, on-board computer 204, ADV wearable occupant sensor device 250, ADV wearable state sensor 270, ADV control system node 502, and/or one or more border security agency workstations 652 and border security agency server 654 one or more computer components and corresponding functionality as described below to enable the functionality of the computer devices described herein with reference to FIGS. 1-10C, and can include communication transceivers that enable wired and/or wireless communication of device data, device data including transmitted data, received data, real time transmission of data and/or data scheduled for broadcast, data packets of the data, and any other transmission or reception form of communication using transceivers.

For example the computer devices on-board computer 204, ADV wearable occupant sensor device 250, ADV wearable state sensor(s) 270, ADV control system node 502, and/or one or more border security agency workstations 652 and border security agency server 654 may be configured to provide voice and/or data communications functionality in accordance with different types of wireless network systems. For example, ADV 204, in one embodiment, includes a microphone wherein one or more ADV occupants can transmit voice data from the on-board computer 204 to one or more computer system nodes 502 that, in turn, may transmit the voice data to one or more border security agencies 650 via network 608, border security agency network communications backbone 660 (e.g., a communications bus) to one or more border security workstations 652 and the associated border security agency, as described with reference to FIG. 6B. Mobile devices 606 may also communicate with the ADV control network platform 600 via a communication network. Examples of wireless network systems that may be utilized as networks 608, 610 and any one or more networks connected to border security agency network communications backbone 660 to operate to connect the communicatively connect the border security agency 650 to the networks descried herein may further include (but are not limited to) a wireless local area network (WLAN) system, wireless metropolitan area network (WMAN) system, wireless wide area network (WWAN) system, and the like. Examples of suitable wireless network systems offering data communication services may include (but are not limited to) the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and the like. It should be noticed that references WAN and WWAN may be made interchangeably throughout the disclosure and/or references to LAN and WLAN may be made interchangeably throughout the disclosure.

The computer devices on-board computer 204, ADV wearable occupant sensor device 250, ADV wearable state sensor(s) 270, ADV control system node 502, and/or one or more border security agency workstations 652 and border security agency server 654 may also include, for example, one or more data input ports. For example, I/O interfaces 260 for the ADV wearable occupant sensor device 250, I/O interfaces 270 for the ADV wearable state sensor(s) 270, I/O interfaces 316 for the on-board computer 204, and the I/O interfaces for any of the additional computers described herein may be configured such that any type of data, media content, and/or inputs can be received, such as user-selectable inputs using display 210, messages using display 210 or a microphone (not shown) connected to the on-board computer 204, recorded video content, and any other type of audio, video, and/or image data received from any content and/or data source, including the occupant sensors 208 which includes ADV wearable occupant sensor device 250 and ADV state sensor(s) 270, the navigation and control sensors 218, ADV reference sensors 216, etc. The data input ports may also include USB ports, coaxial cable, internal connectors for flash memory or other memory devices described herein, and readable media such as flash memory sticks, CDs and DVDs. These data input ports may be used to couple the computer device to components, peripherals, or accessories such as microphones or cameras. Additionally, the computer device may include media capture components, such as an integrated microphone to capture audio and a camera to capture still images and/or video media content.

The transceiver modules utilized in on-board computer 204 (e.g., transceiver 206, communications transceiver 214, ADV device controller 212 occupant sensors 208), ADV wearable occupant sensor device 250, ADV wearable state sensor(s) 270 or in any one or more of the other described herein such as, for example, navigation and control sensors 218, ADV reference sensors 216, etc. may include one or more transceivers configured to communicate using different types of protocols, communication ranges, operating power requirements, RF sub-bands, information types (e.g., voice or data), use scenarios, applications, and/or the like. In various embodiments, one or more of the aforementioned transceivers may comprise, for example, one or more transceivers configured to support communications between ADVs 602, as described with reference to FIGS. 6A and 6B using any number or combination of communication standards. For example, the transceivers included in or utilized by the on-board computers 204 of ADVs 602 in various embodiments may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The computer devices including on-board computer 204, ADV wearable occupant sensor device 250, ADV wearable state sensor(s) 270, ADV control system node 502, and/or one or more border security agency workstations 652 and border security agency server 654 may also include one or more processors, any of microprocessors, controllers, and the like, which process computer-executable instructions to enable operation of the device and/or an ADV. Alternatively or in addition, the computer device can be implemented with any one or combination of software, hardware, firmware, or fixed logic circuitry that is implemented in connection with processing and control circuits. Although generally not shown, the computer devices including on-board computer 204, ADV wearable occupant sensor device 250, ADV wearable state sensor(s) 270, ADV control system node 502, and/or one more border security agency workstations 652 and border security agency server 654 may also include a system bus or data transfer system that couples the various components within the device (e.g., communications backbone 660 described with reference to FIG. 6B). A system bus can include any one or combination of different bus structures, such as a memory bus or memory controller, a peripheral bus, a universal serial bus, and/or a processor or local bus that utilizes any of a variety of bus architectures.

The computer devices including on-board computer 204, ADV wearable occupant sensor device 250, ADV wearable state sensor 270, ADV control system node 502, and/or one more border security agency workstations 652 and border security agency server 654 may also include one or more memory devices 414 that enable data storage, examples of which include random access memory (RAM), non-volatile memory (e.g., read-only memory (ROM), NAND flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer devices may also include a mass storage media device.

In one or more embodiments, memory devices included within the computer devices including memory device 314 (described with reference to FIG. 4) included in on-board computer 204, memory device 252 included in ADV wearable occupant sensor device 250, memory device 504 included in ADV control system node(s) 502, and/or the memory device included in the one more border security agency workstations 652 and border security agency server 654 provide data storage mechanisms to store data and/or information generated, transmitted, and/or received from the ADV sensors described herein. This information includes the border security data described herein, information transmitted via mobile devices 606 described with respect to FIG. 6A, device data such as one or more sensors described herein, other types of information and/or data, and various device applications including reference and positioning system 304, navigation and driving mode system 306, dynamic routing system 308, mapping system 310, occupant state monitoring system 312, occupant identification system 320, content identification and monitoring system 322, and other systems described herein that are configured as, in one or more embodiments described herein, software applications.

For example, any one or more of the reference and positioning system 304, navigation and driving mode system 306, dynamic routing system 308, mapping system 310, occupant state monitoring system 312, occupant identification system 320, content identification and monitoring system 322, and operating system (not illustrated) (i.e., systems that may be configured as device applications) included in on-board computer 204 can be maintained as software instructions within memory device 314 and executed on the one or more processors 302. Similarly, one or more of the mapping SYSTEM 508, ADV reference system 510, routing system 512, and occupant and content identification system 522 (i.e., systems that may be configured as device applications) can be maintained as software instructions within memory device 504 and executed on the one or more processors 514 included in the ADV control and system nodes 502. Each of the device applications may also include a device manager, such as any form of a control application, software application, signal-processing and control module, code that is native to a particular device, a hardware abstraction layer for a particular device, and so on.

In one or more embodiments, on-board computer 204 and/or one or more control system nodes 502 include an in-memory processing system configured to perform in-memory processing that can include memory data grid applications (e.g., Hazelcast IMDG, Infinispan, Pivotal GemFire XD, Oracle Coherence, GridGain Enterprise Edition, IBM WebSphere Application Server, Ehcache, XAP, Red Hat JBoss Data Grid, ScaleOut SateServer, Galaxy, etc.) to retrieve data from the associated accessible data storage device. In one or more embodiments, on-board computer 204 includes one or more RAM memory devices (e.g., SDRAM, DDR SDRAM, DDR2 SDRAM, DDR3 SDRAM, DDR4 SDRAM, etc.)(not shown) and/or flash memory (not shown) that may be utilized to perform in-memory processing in association with data storage 314 (e.g., a database, disk, memory bank, or any other suitable large memory device) or other storage devices accessible by on-board computer 204. Similarly, one or more nodes 502 may utilize one or more RAM memory devices 524 to perform in-memory processing in association with the data and information stored in the map storage database 506 and/or other storage devices associated with the one or more relevant nodes (see examples associated with on-board computer data storage device 314). For example, the relevant data and/or information retrievably stored in data storage 314 and storage database 506 or any other storage device that is utilized to retrievably store and/or generate information (e.g., border security information, mapping information, navigational information, physiological state information, routes, reference information including current position of one or more ADVs, timing information including current times to reach a current destination, etc.) can also be maintained in one or more RAM memory devices, or devices utilized as RAM memory device (e.g., flash memory), and accessed utilizing an processing in-memory system.

The RAM memory device(s) described herein can host all of the relevant data utilized to navigate one or more ADVs, monitor one or ADV occupants in one or more ADVs, generate routes for one or more ADVs as described herein, continuously monitor one or more ADVs and the contents transported by the one or more ADVs as described herein utilizing the sensors described herein and/or, in one or more embodiments, host the entirety of the large memory structures in memory. In these embodiments, to ensure the durability of the data and information stored in RAM, copies of the data can also be stored in the associated long-term memory devices (i.e., data storage 314 and/or storage system 506). Flash memory may also be used in association with or in place of the RAM memory device(s) to be used for the on-board computer system memory and/or for the system memory for one or more nodes 502 for in-memory processing. For example, all of the relevant data required by either the on-board computer 204 and/or control system nodes 502 to perform the functions described herein can be loaded into the associated system memory from the source database so that it can be processed in-memory instead of repetitively querying one or more databases for the required information. In one or more embodiments, the contents of one or more relevant databases (i.e., the entire database) may be loaded into the system memory for processing.

In one embodiment, the on-board computer 204 includes audio and video processing systems that are included in the navigation and driving mode system 306, ADV device controller 212, and occupant state monitoring system 312 that generates audio data and video data to assist in navigating the ADV as described herein, monitor one or more ADV occupants as described herein, and generate display data as described herein for a display system 210. Similarly, ADV wearable occupant sensor device 250 includes audio and video processing systems for communicating physiological state information to a relevant ADV occupant. In one embodiment, each ADV occupant is wearing an ADV wearable occupant sensor device 250 and one or more ADV wearable state sensor devices 270 to assist the ADV in monitoring the physiological state of the ADV occupants. The audio system and/or the display system may include any devices that process, display, and/or otherwise render audio, video, display, and/or image data. For example, one or more occupant sensors 208 can be camera devices that generate video data that is converted into video files that can be stored locally on computer 204, transmitted to one or more computer and system nodes 502, and/or transmitted via network 608 to a border security entity. The video file(s) that includes one or more videos of one or more ADV occupants can be transmitted in response to a request for a heightened security screening. Additionally, image files that include images of one or more ADV occupants may be created by on-board computer 204 utilizing image data generated by one or more occupant sensor devices 208 that can be one or more cameras. These image files can also be transmitted to a border security agency upon a request for a heightened security screening. In one or more examples, any of the border security data discussed herein can be transmitted to a border security agency at a scheduled time determined by an ADV on-board computer 204, one or more computer and system nodes 502, or a border security entity.

In one or more embodiments, on-board computer 204 also utilizes one or more occupant sensors 208 that are camera devices that generate video data that can be used in conjunction with a secure Internet-enabled video conferencing application, such as Skype™, ClickMeeting™, Join.me™ and others to enable ADV occupants to communicate with border security personnel. Using video conferencing simultaneously with the disclosed system provides a tool for the ADV computer to interface with border security personnel and allow the ADV system to assist border security personnel in screening ADV occupants and/or ADV contents transported by ADV vehicles to remotely perform security screenings and/or request a heightened security screening.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 428. Additionally, the audio system and/or the display system may be external components to the computer device, or alternatively, are integrated components of the example computer device.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure has been described more fully herein with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The detailed description herein is, therefore, not intended to be taken in a limiting sense Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Likewise, the term "if" may be interpreted as "in response to."

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A system to route an autonomous driving vehicle, comprising:
    an on-board computer comprising;
    one or more processors programmed to autonomously navigate a vehicle along a current route to a predetermined first destination;
    one or more sensor devices communicatively coupled to the on-board computer;
        wherein the one or more sensors devices are configured to generate sensor data that is indicative of an identification of one or more persons and one or more items within the vehicle;
        wherein the at least one of the one or more processors, in response to generating security screening data, is programmed to;
            generate security screening data utilizing at least a portion of the sensor data;
            transmit the security screening data to a border security entity;
        wherein at least one of the one or more processors, in response to a request for a heightened security screening, is programmed to;
            receive a security entity location that represents a geographical location of a security entity;
            determine a current vehicle location that represents a current geographical location of the vehicle;
            generate mapping information for a geographical area that includes the current vehicle location, the security entity location and one or more navigable pathways between the current vehicle location and the security entity location;
            utilizing the mapping information, generate a new current route from the current vehicle location to the security entity location that includes one or more of the navigable pathways; and
            automatically re-route and autonomously navigate the vehicle from the current vehicle location to the security entity location along the new current route;
    a data storage device communicatively coupled to the one or more processors for retrievably storing data; and
    an in-memory processing system that includes the at least one of the one or more processors to perform in-memory processing of data received from one or more devices included in the system.

2. The system of claim 1, wherein the at least one of the one or more processors, in response to receiving the security entity location, is programmed to:
    utilize mapping information and generate a second route from the current vehicle location to the security entity location and a corresponding second route time that represents a time that it will take the vehicle to reach the security entity location from the current vehicle location;
    utilize mapping information and generate a set of one or more alternative routes that include one or more navigable pathways from the current vehicle location to the security entity location and a corresponding set of one or more alternative route times for each alternative route that represents a time that it will take from the current vehicle location to reach the security entity location, wherein each alternative route includes at least one navigable pathway that is not included within the second route or any of the other alternative routes;
    wherein the at least one of the one or more processors, in response to the identification of the set of one or more alternative routes, is programmed to determine the new current route by;
        comparing the second route time to the set of alternative route times;
        determining a shortest time between the second route time and any of the alternative route times; and
        setting the route associated with the shortest time as the new current route of the vehicle.

3. The system of claim 1, wherein the request for a heightened security screening is determined by;
    wirelessly transmitting the security screening data to the border security entity and receiving the request from the border security entity for the heightened security screening.

4. The system of claim 1, wherein the request for a heightened security screening is determined by the at least one or more processors programmed to;
    wirelessly access one or more governmental data storage structures;
    compare at least a portion of the security screening data that includes the identification of one or more occupants within the vehicle to the contents of the data storage structure;
    utilize the data stored within the one or more governmental data storage structures to confirm the identification of the one or more occupants within the vehicle;
    compare the confirmed and unconfirmed security screening data to a list of factors; and
    generate the request for a heightened security screening in response to any of the confirmed and unconfirmed security screening data satisfying a factor.

5. The system of claim 1, wherein the request for a heightened security screening is determined by the at least one or more processors programmed to;
    wirelessly access one or more governmental data storage structures;
    compare at least a portion of the security screening data that includes the identification of one or more occupants within the vehicle to the contents of the data storage structure;
    utilize the data stored within the one or more governmental data storage structures to confirm the identification of the one or more occupants within the vehicle;
    compare the confirmed and unconfirmed security screening data to a list of factors wherein each factor has a numerical risk value associated therewith that can be combined to determine a level of risk;
    determine if the level of risk meets a risk value threshold; and
    generate the request for a heightened security screening in response to the level of risk meeting the risk value threshold.

6. The system of claim 1, wherein the one or more sensors comprise;
    at least one of one or more cameras that is configured to generate image data of one or more persons within the vehicle and one or more items placed within the vehicle; and
    at least one of one or more transducers that is configured to generate data indicative of a weight of the one or more items placed within the vehicle;

wherein the at least one of the one or more processors are programmed to;
  process the data generated by the camera and the transducer to assist in the identification of the one or more persons and the one or more items within the vehicle.

7. The system of claim 1, wherein the at least one of the one more processors are programmed to;
  initiate a monitoring mode wherein the at least one of the one more processors is ready to receive physiological state data concerning a person's one or more vital signs from at least one of the one or more sensor devices;
  calibrate the at least one of the one or more sensor devices with respect to one or more of the person's vital signs to obtain a normal range for the one or more vital signs;
  process the received physiological state data to determine in real time if one or more events is detected; and
  transmit the event to the border security entity;
  wherein the process includes;
    analyzing the physiological state data to determine measurements of the one or more vital signs; and
    comparing the current measurement of the one or more vital signs to a predetermined normal range of the one or more vital signs for the person.

8. A processor implemented method for routing an autonomous driving vehicle comprising:
  autonomously navigating a passenger vehicle along a current route to a predetermined first destination using mapping information generated by at least one of one or more processors;
  generating, utilizing at least one of one or more sensor devices, sensor data indicative of security screening data that includes identification data concerning the identification of one or more persons and one or more items within the vehicle;
  transmitting, by the at least one of the one or more processors, at least a portion of the security screening data to a border security entity;
  receiving a request for a heightened security screening;
  receiving a security entity location that represents a geographical location of the security entity;
  determining a current vehicle location that represents a current geographical location of the vehicle;
  generating mapping information, utilizing data retrieved from a storage device, for a geographical area that includes the current vehicle location, the security entity location and one or more navigable pathways between the current vehicle location and the security entity location;
  performing in-memory processing using an in-memory processing system that includes the at least one of the one or more processors utilizing the mapping information to generate a new current route from the current vehicle location to the security entity location that includes one or more of the navigable pathways; and
  automatically re-routing and autonomously navigating the vehicle from the current vehicle location to the security entity location along the new current route.

9. The processor implemented method of claim 8, further comprising:
  in response to receiving the security entity location,
  generating, utilizing the mapping information, a second route from the current vehicle location to the security entity location and a corresponding second route time that represents a time that it will take the vehicle to reach the security entity location from the current vehicle location;
  generating, utilizing the mapping information, a set of one or more alternative routes that include one or more navigable pathways from the current vehicle location to the security entity location and a corresponding set of one or more alternative route times for each alternative route that represents a time that it will take from the current vehicle location to reach the security entity location, wherein each alternative route includes at least one navigable pathway that is not included within the second route or any of the other alternative routes; and
  in response to the identification of the set of one or more alternative routes, determining the new current route by;
    comparing the second route time to the set of alternative route times;
    determining a shortest time between the second route time and any of the alternative route times; and
    setting the route associated with the shortest time as the new current route of the vehicle.

10. The processor implemented method of claim 8, wherein the step of receiving a request for a heightened security screening further comprises:
  wirelessly transmitting the security screening data to the border security entity; and
  receiving the request from the border security entity for the heightened security screening.

11. The processor implemented method of claim 8, wherein the step of receiving a request for a heightened security screening further comprises:
  wirelessly accessing one or more governmental data storage structures;
  comparing at least a portion of the security screening data that includes the identification of one or more occupants within the vehicle to the contents of the data storage structure;
  utilizing the data stored within the one or more governmental data storage structures to confirm the identification of the one or more occupants within the vehicle;
  comparing the confirmed and unconfirmed security screening data to a list of factors; and
  generating the request for the heightened security screening in response to any of the confirmed and unconfirmed security screening data satisfying a factor.

12. The processor implemented method of claim 8, wherein the step of receiving a request for a heightened security screening further comprises:
  wirelessly accessing one or more governmental data storage structures;
  comparing at least a portion of the security screening data that includes the identification of one or more occupants within the vehicle to the contents of the data storage structure;
  utilizing the data stored within the one or more governmental data storage structures to confirm the identification of the one or more occupants within the vehicle;
  comparing the confirmed and unconfirmed security screening data to a list of factors wherein each factor has a numerical risk value associated therewith that can be combined to determine a level of risk;
  determining if the level of risk meets a risk value threshold; and
  generating the request for the heightened security screening in response to the level of risk meeting the risk value threshold.

13. The processor implemented method of claim 8, wherein the step of generating sensor data indicative of security screening data further comprises:
generating, by at least one of one or more cameras, image data of one or more persons within the vehicle and one or more items placed within the vehicle; and
generating, by at least one of one or more transducers, data indicative of a weight of the one or more items placed within the vehicle.

14. The processor implemented method of claim 8, wherein the step of generating, by at least one of one or more sensor devices, sensor data further comprises:
initiating a monitoring mode wherein the at least one of the one more processors is ready to receive physiological state data concerning a person's one or more vital signs from at least one of the one or more sensor devices;
calibrating the at least one of the one or more sensor devices with respect to one or more of the person's vital signs to obtain a normal range for the one or more vital signs;
processing the received physiological state data to determine in real time if one or more events is detected; and
transmitting the event to the border security entity;
wherein the step of processing the received physiological state data further includes;
analyzing the physiological state data to determine measurements of the one or more vital signs; and
comparing the current measurement of the one or more vital signs to a predetermined normal range of the one or more vital signs for the person.

15. A computer program product for routing an autonomous driving vehicle, the computer program product comprising a non-transitory computer readable storage medium having program code embodied therewith, the program code readable and executable by at least one of one or more processors to perform a method comprising:
autonomously navigating a passenger vehicle along a current route to a predetermined first destination using mapping information generated by at least one of one or more processors; and
in response to receiving by one or more sensor devices sensor data indicative of the identification of one or more persons and one or more items within the vehicle, generating security screening data;
transmitting at least a portion of the security screening data to a border security entity;
receiving a request for a heightened security screening;
receiving a security entity location that represents a geographical location of the security entity;
determining a current vehicle location that represents a current geographical location of the vehicle;
generating mapping information, utilizing data retrieved from a storage device, for a geographical area that includes the current vehicle location, the security entity location and one or more navigable pathways between the current vehicle location and the security entity location;
performing in-memory processing using an in-memory processing system utilizing the mapping information to generate a new current route from the current vehicle location to the security entity location that includes one or more of the navigable pathways; and
automatically re-routing and autonomously navigating the vehicle from the current vehicle location to the security entity location along the new current route.

16. The computer product of claim of claim 15, wherein the method further comprises:
in response to receiving the security entity location,
generating, by the in-memory processing system utilizing the mapping information, a second route from the current vehicle location to the security entity location and a corresponding second route time that represents a time that it will take the vehicle to reach the security entity location from the current vehicle location;
generating, by the in-memory processing system utilizing the mapping information, a set of one or more alternative routes that include one or more navigable pathways from the current vehicle location to the security entity location and a corresponding set of one or more alternative route times for each alternative route that represents a time that it will take from the current vehicle location to reach the security entity location, wherein each alternative route includes at least one navigable pathway that is not included within the second route or any of the other alternative routes; and
in response to the identification of the set of one or more alternative routes, determining the new current route by;
comparing the second route time to the set of alternative route times;
determining a shortest time between the second route time and any of the alternative route times; and
setting the route associated with the shortest time as the new current route of the vehicle.

17. The computer product of claim of claim 15, wherein the step of receiving a request for a heightened security screening further comprises:
wirelessly transmitting the security screening data to the border security entity; and
receiving the request from the border security entity for the heightened security screening.

18. The computer product of claim of claim 15, wherein the step of receiving a request for a heightened security screening further comprises:
wirelessly accessing one or more governmental data storage structures;
comparing at least a portion of the security screening data that includes the identification of one or more occupants within the vehicle to the contents of the data storage structure;
utilizing the data stored within the one or more governmental data storage structures to confirm the identification of the one or more occupants within the vehicle;
comparing the confirmed and unconfirmed security screening data to a list of factors; and
generating the request for the heightened security screening in response to any of the confirmed and unconfirmed security screening data satisfying a factor.

19. The computer product of claim of claim 15, wherein the step of receiving a request for a heightened security screening further comprises:
wirelessly accessing one or more governmental data storage structures;
comparing at least a portion of the security screening data that includes the identification of one or more occupants within the vehicle to the contents of the data storage structure;
utilizing the data stored within the one or more governmental data storage structures to confirm the identification of the one or more occupants within the vehicle;

comparing the confirmed and unconfirmed security screening data to a list of factors wherein each factor has a numerical risk value associated therewith that can be combined to determine a level of risk;

determining if the level of risk meets a risk value threshold; and generating the request for the heightened security screening in response to the level of risk meeting the risk value threshold.

20. The computer product of claim of claim 15, wherein the step of generating security screening data further comprises:

processing image data of one or more persons within the vehicle and one or more items placed within the vehicle generated by the at least one or more camera devices;

processing data indicative of a weight of the one or more items placed within the vehicle generated by at least one of one or more transducers;

initiating a monitoring mode wherein the at least one of the one more processors is ready to receive physiological state data concerning a person's one or more vital signs from at least one of the one or more sensor devices;

calibrating the at least one of the one or more sensor devices with respect to one or more of the person's vital signs to obtain a normal range for the one or more vital signs;

processing the received physiological state data to determine in real time if one or more events is detected; and transmitting the event to the border security entity;

wherein the step of processing the received physiological state data further includes;

analyzing the physiological state data to determine measurements of the one or more vital signs; and comparing the current measurement of the one or more vital signs to a predetermined normal range of the one or more vital signs for the person.

* * * * *